(12) United States Patent
Moss et al.

(10) Patent No.: US 9,701,032 B2
(45) Date of Patent: Jul. 11, 2017

(54) POWER TOOL ACCESSORY WITH BRACE

(71) Applicant: BLACK & DECKER INC., Newark, DE (US)

(72) Inventors: Darren B. Moss, York, PA (US); Aland Santamarina, Columbia, MD (US); Michael P. Peters, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 236 days.

(21) Appl. No.: 14/338,577

(22) Filed: Jul. 23, 2014

(65) Prior Publication Data
US 2016/0023289 A1 Jan. 28, 2016

(51) Int. Cl.
*B26B 15/00* (2006.01)
*B23D 29/02* (2006.01)
*B25F 3/00* (2006.01)
*B23D 29/00* (2006.01)

(52) U.S. Cl.
CPC ............ *B26B 15/00* (2013.01); *B23D 29/005* (2013.01); *B23D 29/02* (2013.01); *B25F 3/00* (2013.01)

(58) Field of Classification Search
CPC ......... B23D 29/005; B23D 29/02; B25F 3/00; B26B 15/00
USPC ........................ 30/228, 500; D8/70; D15/140
See application file for complete search history.

(56) References Cited

U.S. PATENT DOCUMENTS

| | | | |
|---|---|---|---|
| 1,808,228 A * | 6/1931 | Hulack et al. ....... | B23D 49/162 |
| | | | 30/500 |
| 1,898,956 A | 2/1933 | Harvie | |
| 2,256,799 A | 9/1941 | McHenry | |
| 2,319,973 A * | 5/1943 | Broderhausen .... | B23D 57/0076 |
| | | | 30/500 |
| 2,387,411 A | 10/1945 | Schmidt et al. | |
| 2,457,829 A * | 1/1949 | Miller .................... | B23D 49/16 |
| | | | 30/500 |
| 2,504,880 A | 4/1950 | Rittenhouse et al. | |

(Continued)

FOREIGN PATENT DOCUMENTS

| AT | 410065 B * | 1/2003 |
|---|---|---|
| CH | 666207 A5 * | 7/1988 |

(Continued)

OTHER PUBLICATIONS

Rabolini, Marco—European Search Report re: EP15178011.1-1709—Jan. 5, 2016—8 pages.

*Primary Examiner* — Jason Daniel Prone
(74) *Attorney, Agent, or Firm* — Scott B. Markow

(57) ABSTRACT

A power tool accessory (e.g., a shear accessory) includes an accessory housing, an input shaft, a working tool, and a brace. The input shaft is driven by a power tool and drives the working tool. The brace rigidly connects the accessory housing to a power tool housing. The brace includes a collar coupled to the accessory housing, a clamp assembly that may be rigidly connected to the power tool housing, and an arm assembly connecting the collar to the clamp assembly. The collar allows selective rotation of the accessory housing relative to the collar while the brace rigidly couples the accessory housing to the power tool housing. The arm assembly may have a single arm. The clamp assembly may be coupled to a base of a handle of the power tool with arm assembly at an angle to a working axis of the power tool.

23 Claims, 36 Drawing Sheets

(56) References Cited

U.S. PATENT DOCUMENTS

| | | | | |
|---|---|---|---|---|
| 2,544,461 A * | 3/1951 | Leitzel | B23D 47/126 | |
| | | | 30/500 | |
| 2,621,685 A * | 12/1952 | Butz | B23D 49/162 | |
| | | | 30/500 | |
| 2,625,964 A * | 1/1953 | Green et al. | B23D 53/12 | |
| | | | 30/500 | |
| 2,631,619 A * | 3/1953 | Folli | B23D 49/162 | |
| | | | 30/500 | |
| 2,635,335 A | 4/1953 | James | | |
| 2,696,129 A * | 12/1954 | Riblet | B25H 1/0057 | |
| | | | 408/99 | |
| 2,710,632 A * | 6/1955 | Richter, Jr. | B23D 49/007 | |
| | | | 30/500 | |
| 2,714,905 A * | 8/1955 | Clayton | B23D 57/0076 | |
| | | | 30/500 | |
| 2,760,265 A | 8/1956 | Draenert | | |
| 2,787,265 A * | 4/1957 | Neidt | B23D 57/0076 | |
| | | | 30/500 | |
| 2,788,810 A * | 4/1957 | Jones | B27C 9/005 | |
| | | | 30/500 | |
| 2,793,661 A * | 5/1957 | Olson | B23D 49/165 | |
| | | | 30/500 | |
| 2,822,005 A * | 2/1958 | Lee | B23D 49/162 | |
| | | | 30/500 | |
| 2,840,904 A | 7/1958 | Hutchins | | |
| 2,906,304 A * | 9/1959 | Levine | B23D 49/08 | |
| | | | 30/500 | |
| 2,982,320 A * | 5/1961 | Trumbull et al. | B23D 57/0076 | |
| | | | 30/500 | |
| 2,990,024 A * | 6/1961 | Van Allsburg | B23Q 11/0046 | |
| | | | 175/211 | |
| 3,006,390 A | 10/1961 | Draenert | | |
| 3,025,599 A | 3/1962 | Sauers et al. | | |
| 3,046,817 A * | 7/1962 | Schwable | B25H 1/0064 | |
| | | | 408/110 | |
| 3,077,129 A * | 2/1963 | Caries | B25H 1/0078 | |
| | | | 408/112 | |
| D197,987 S | 4/1964 | Docken | | |
| 3,130,759 A | 4/1964 | Mohr | | |
| 3,260,289 A * | 7/1966 | Whitten, Jr. | B23D 49/162 | |
| | | | 30/500 | |
| 3,585,719 A | 6/1971 | Kivela | | |
| 3,654,700 A | 4/1972 | Pawloski | | |
| 3,768,363 A * | 10/1973 | Tackett | B23C 1/20 | |
| | | | 30/500 | |
| 3,876,015 A | 4/1975 | Kivela | | |
| 3,940,852 A * | 3/1976 | Ruf | B23D 27/02 | |
| | | | 30/500 | |
| 4,173,069 A | 11/1979 | Sidenstick et al. | | |
| 4,312,610 A * | 1/1982 | Burt | B23D 27/04 | |
| | | | 30/500 | |
| 4,317,282 A * | 3/1982 | Pace | A01D 34/412 | |
| | | | 30/500 | |
| 4,381,605 A * | 5/1983 | Holm | B23D 19/04 | |
| | | | 30/500 | |
| 4,682,416 A | 7/1987 | Stolfa | | |
| 4,712,983 A * | 12/1987 | Moynihan | F04B 9/02 | |
| | | | 74/665 C | |
| 4,748,744 A | 6/1988 | Turner | | |
| 4,841,643 A * | 6/1989 | Colella | B23D 51/02 | |
| | | | 30/500 | |
| 5,224,231 A | 7/1993 | Nacar | | |
| 5,224,803 A * | 7/1993 | Lallier | B23B 45/003 | |
| | | | 30/500 | |
| 5,239,758 A * | 8/1993 | Lindell | B23D 57/0076 | |
| | | | 30/500 | |
| 5,371,947 A | 12/1994 | Dickey et al. | | |
| 5,409,243 A | 4/1995 | Shadeck et al. | | |
| 5,445,480 A * | 8/1995 | Merriman | E02D 27/34 | |
| | | | 408/87 | |
| 5,465,983 A | 11/1995 | Owens et al. | | |
| 5,555,780 A * | 9/1996 | Beach | B25B 21/002 | |
| | | | 30/500 | |
| 5,566,768 A | 10/1996 | Bourke | | |
| 5,595,250 A | 1/1997 | Bourke | | |
| 5,607,265 A | 3/1997 | Lane | | |
| 5,755,293 A | 5/1998 | Bourke | | |
| 5,765,839 A | 6/1998 | Roehm | | |
| 5,901,447 A | 5/1999 | Dunning | | |
| 5,992,024 A | 11/1999 | Rogers | | |
| 6,178,643 B1 | 1/2001 | Erbrick et al. | | |
| 6,264,211 B1 * | 7/2001 | Granado | B23D 57/0076 | |
| | | | 30/500 | |
| 6,651,348 B1 * | 11/2003 | Steinmann | B23D 51/16 | |
| | | | 30/500 | |
| D487,386 S | 3/2004 | Clivio | | |
| 6,712,368 B2 * | 3/2004 | Bohn | B25F 3/00 | |
| | | | 30/500 | |
| D488,695 S | 4/2004 | Peterson | | |
| 6,776,150 B2 | 8/2004 | Gaidjiergis et al. | | |
| 6,820,339 B2 * | 11/2004 | Albrightson | B23D 49/11 | |
| | | | 30/500 | |
| 6,860,488 B2 | 3/2005 | Mack | | |
| D512,623 S | 12/2005 | Huang | | |
| D513,953 S | 1/2006 | Peterson | | |
| 7,093,365 B2 | 8/2006 | Peterson | | |
| D538,126 S * | 3/2007 | Aglassinger | D8/68 | |
| 7,293,362 B2 * | 11/2007 | Konen | B23D 29/002 | |
| | | | 30/228 | |
| D559,647 S | 1/2008 | Watson | | |
| 7,464,473 B2 | 12/2008 | Fladgard et al. | | |
| 7,513,048 B2 * | 4/2009 | De Salles | B23B 45/003 | |
| | | | 30/500 | |
| D593,389 S * | 6/2009 | Clayton | D8/70 | |
| 7,891,101 B2 * | 2/2011 | Brady | B23D 45/003 | |
| | | | 30/500 | |
| 7,971,360 B2 | 7/2011 | Clark et al. | | |
| 8,047,100 B2 | 11/2011 | King | | |
| 8,191,268 B2 * | 6/2012 | Willetts | A01G 3/08 | |
| | | | 30/500 | |
| 8,209,830 B1 * | 7/2012 | Crespo | B23B 45/003 | |
| | | | 30/500 | |
| 8,479,354 B1 * | 7/2013 | Doyle | A47L 7/009 | |
| | | | 30/500 | |
| D719,806 S * | 12/2014 | Wiedemann | D8/70 | |
| 8,919,787 B1 * | 12/2014 | Wilcher | B23D 51/10 | |
| | | | 30/394 | |
| D730,141 S * | 5/2015 | Moss | D15/140 | |
| 2005/0028391 A1 | 2/2005 | Peterson | | |
| 2006/0112566 A1 | 6/2006 | Peterson et al. | | |
| 2008/0222898 A1 | 9/2008 | Staples | | |
| 2013/0213683 A1 * | 8/2013 | Brewster | B23Q 11/00 | |
| | | | 173/198 | |
| 2014/0182137 A1 * | 7/2014 | Liu | B23D 21/00 | |
| | | | 30/92 | |
| 2014/0260831 A1 * | 9/2014 | Hays | B25B 23/0064 | |
| | | | 81/434 | |
| 2016/0039019 A1 * | 2/2016 | Bublitz | B25F 5/02 | |
| | | | 30/228 | |
| 2016/0114471 A1 * | 4/2016 | Wong | B25F 5/026 | |
| | | | 30/500 | |
| 2016/0150738 A1 * | 6/2016 | Hall | B26B 15/00 | |
| | | | 30/228 | |
| 2016/0221200 A1 * | 8/2016 | Winkel | B23Q 15/007 | |
| | | | 30/228 | |
| 2016/0268068 A1 * | 9/2016 | Chiasson | H01H 3/20 | |
| | | | 30/228 | |
| 2016/0271781 A1 * | 9/2016 | Kobayashi | B25F 3/00 | |
| | | | 30/500 | |
| 2016/0375510 A1 * | 12/2016 | Batho | B23D 29/005 | |
| | | | 30/194 | |
| 2017/0021488 A1 * | 1/2017 | Gerber | B23D 29/005 | |
| | | | 30/500 | |

FOREIGN PATENT DOCUMENTS

| | | |
|---|---|---|
| DE | 899746 C | 9/1954 |
| DE | 2515839 A1 * | 10/1976 |

(56) References Cited

FOREIGN PATENT DOCUMENTS

| | | | | |
|---|---|---|---|---|
| DE | 2603482 A1 | * | 8/1977 | |
| DE | 3015532 A1 | * | 10/1981 | |
| DE | 3627689 A1 | * | 2/1988 | |
| EP | 2977155 A1 | * | 1/2016 | ........... B23D 29/005 |
| FR | 2278455 A1 | * | 2/1976 | |
| FR | 2325452 A1 | * | 4/1977 | |
| FR | 2502550 A1 | * | 10/1982 | |
| FR | 2505237 A1 | * | 11/1982 | |
| FR | 2981873 A1 | | 5/2013 | |

* cited by examiner

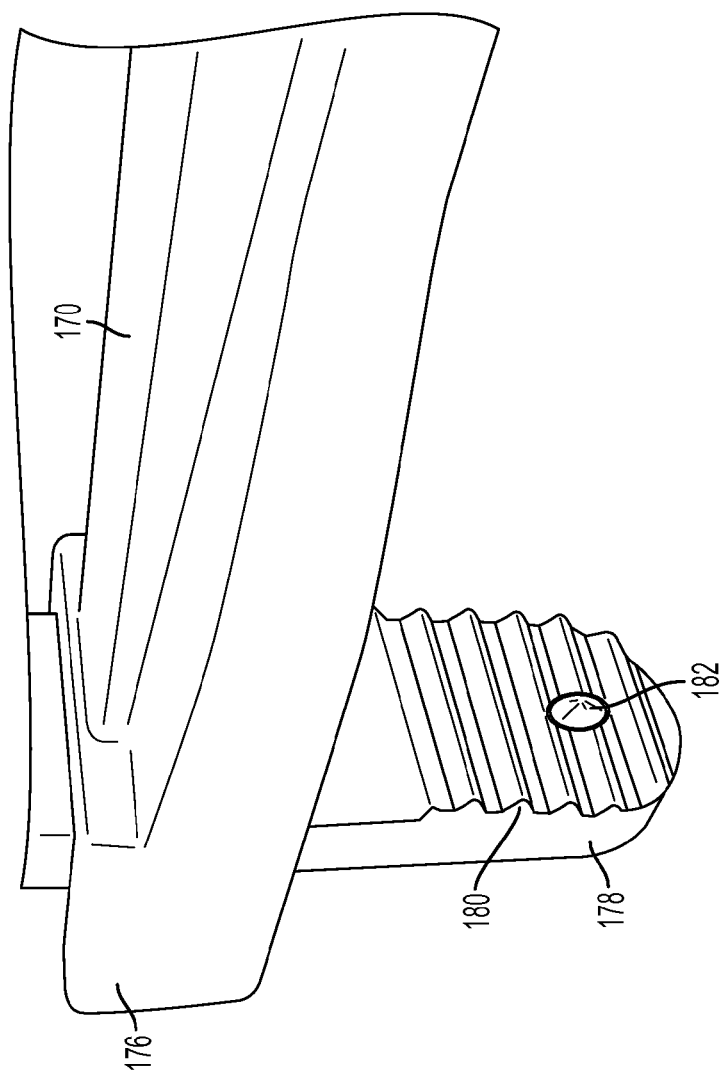

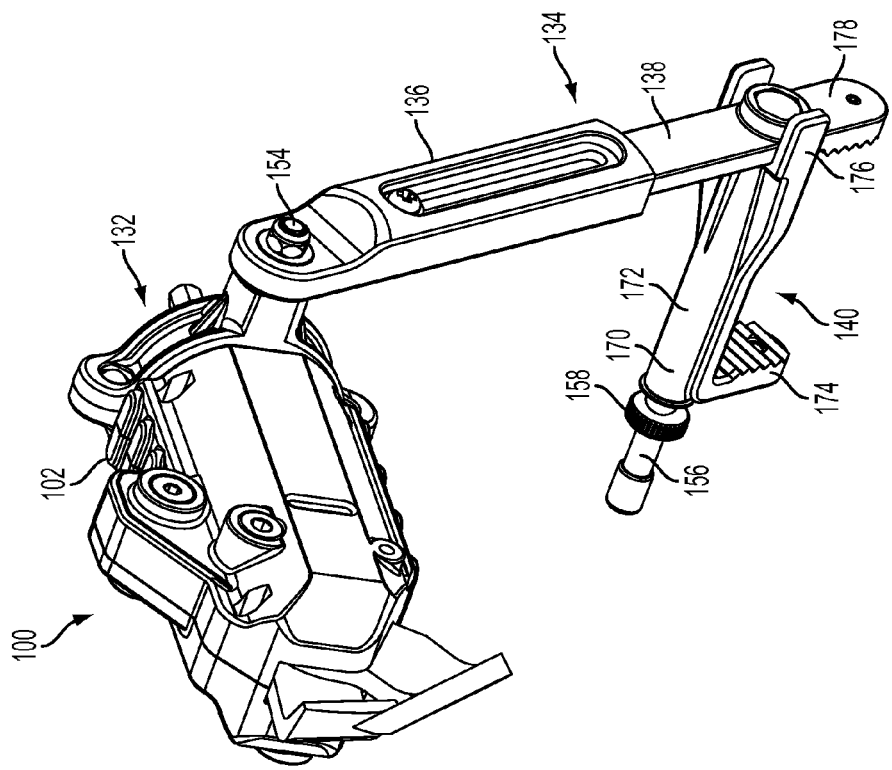
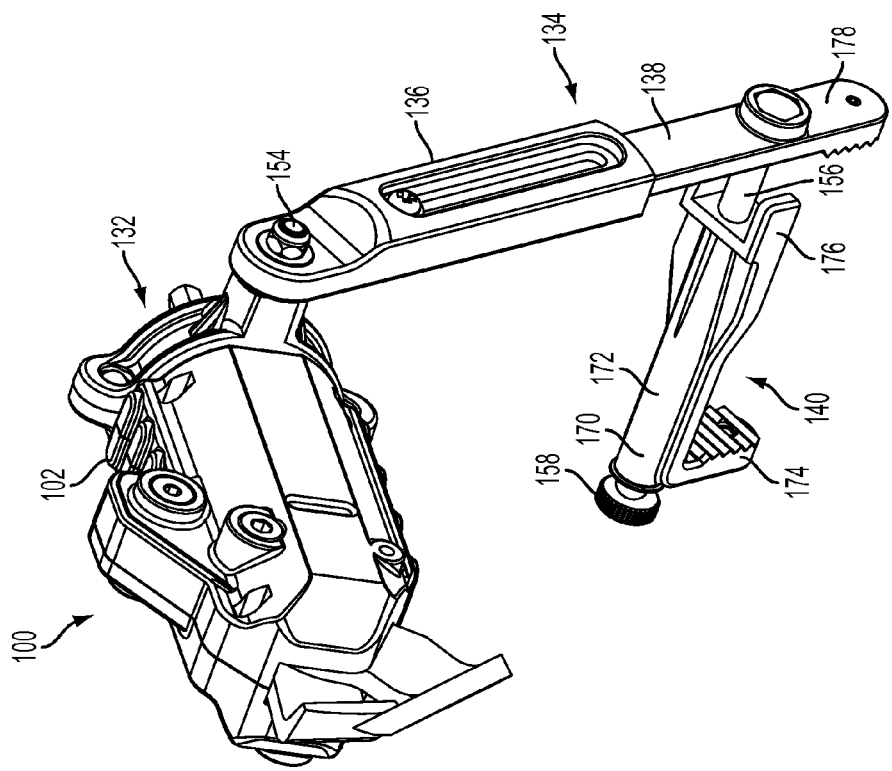

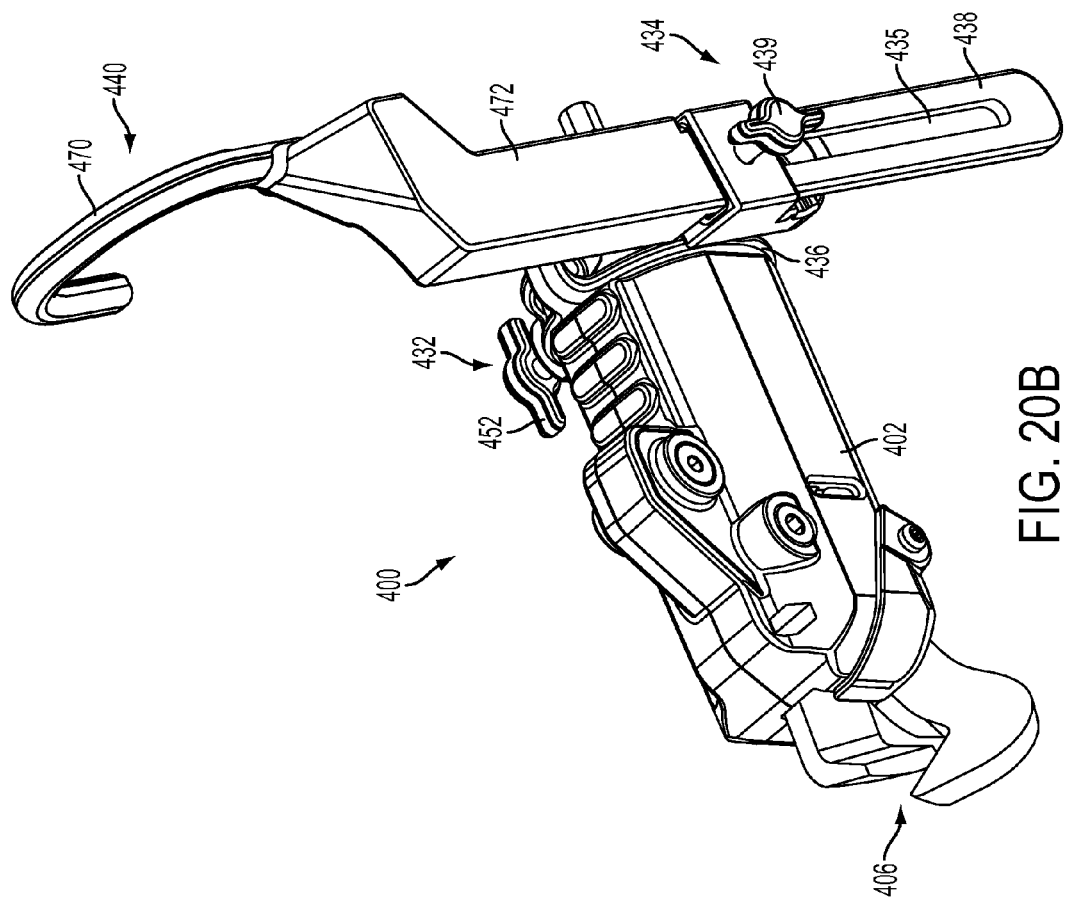

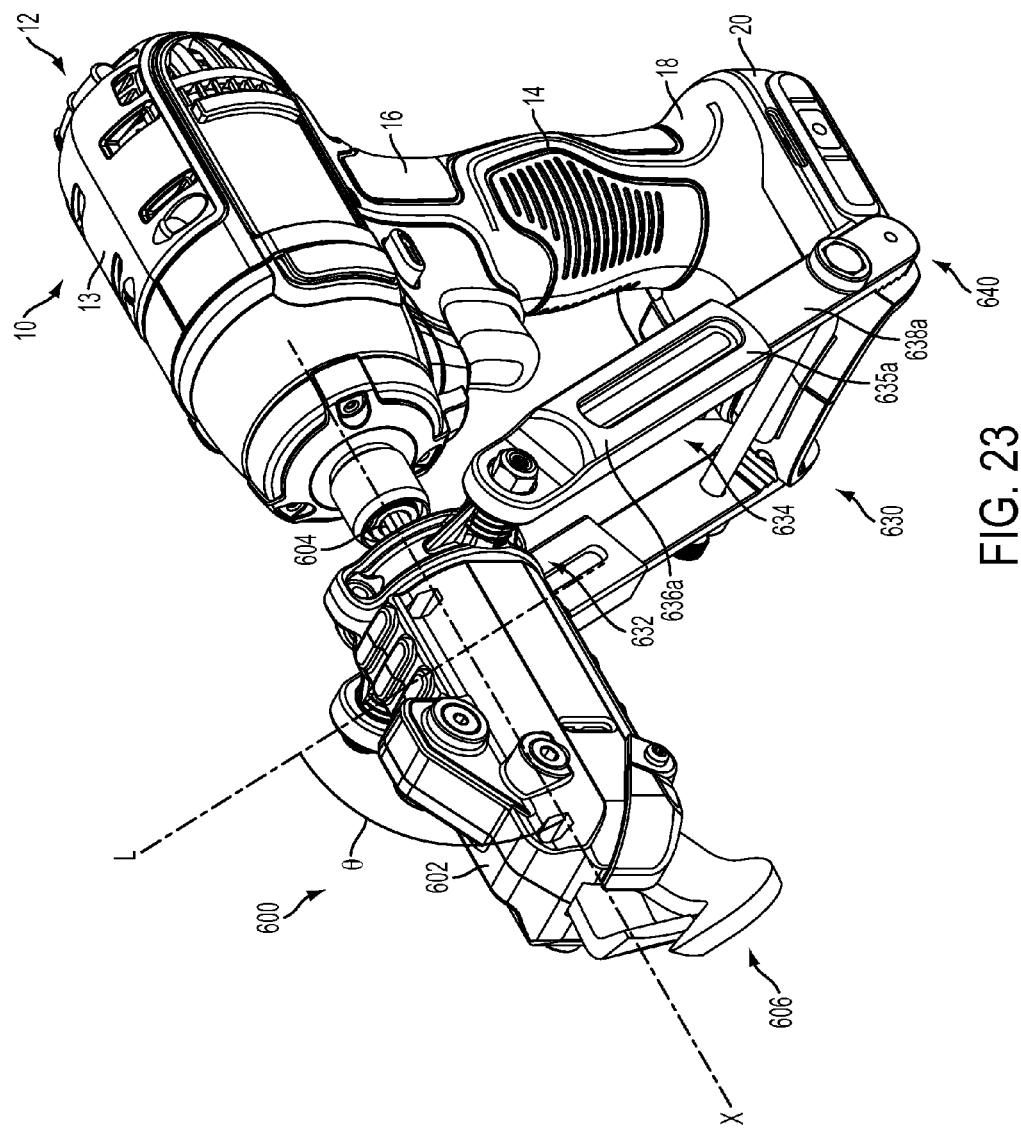

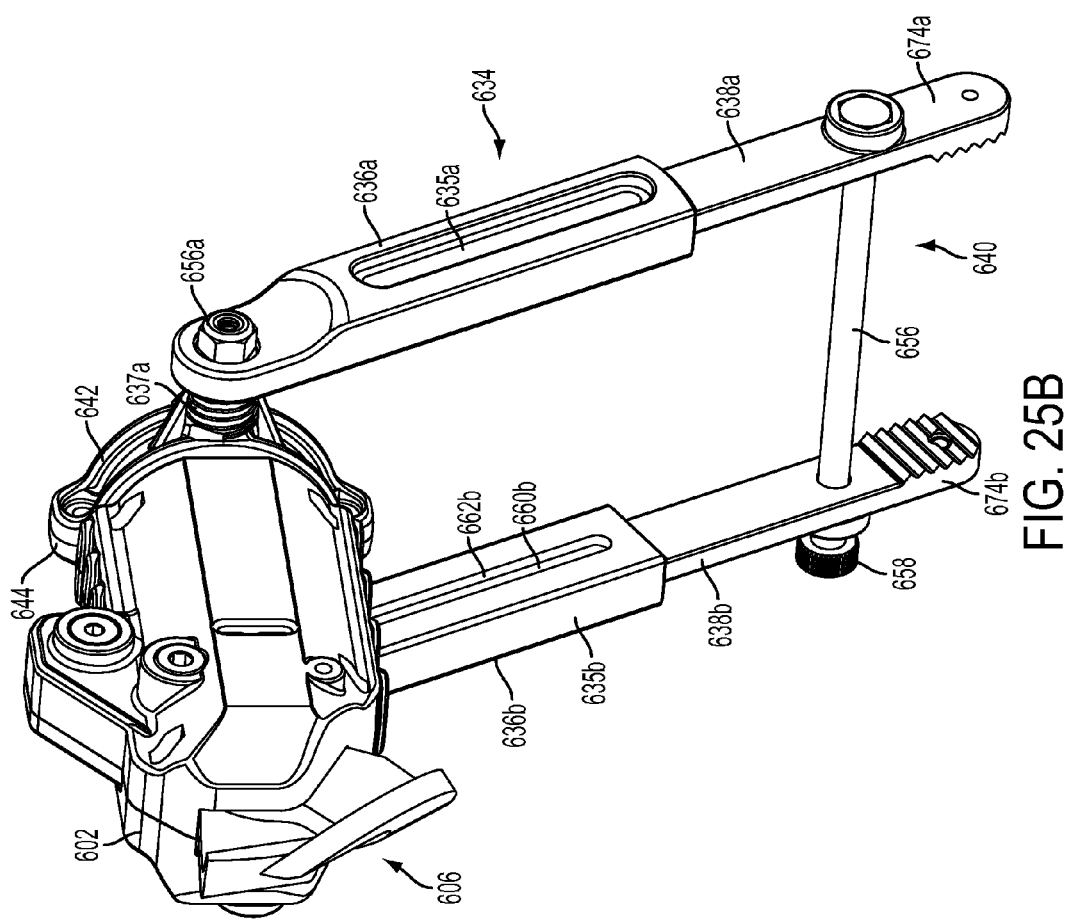

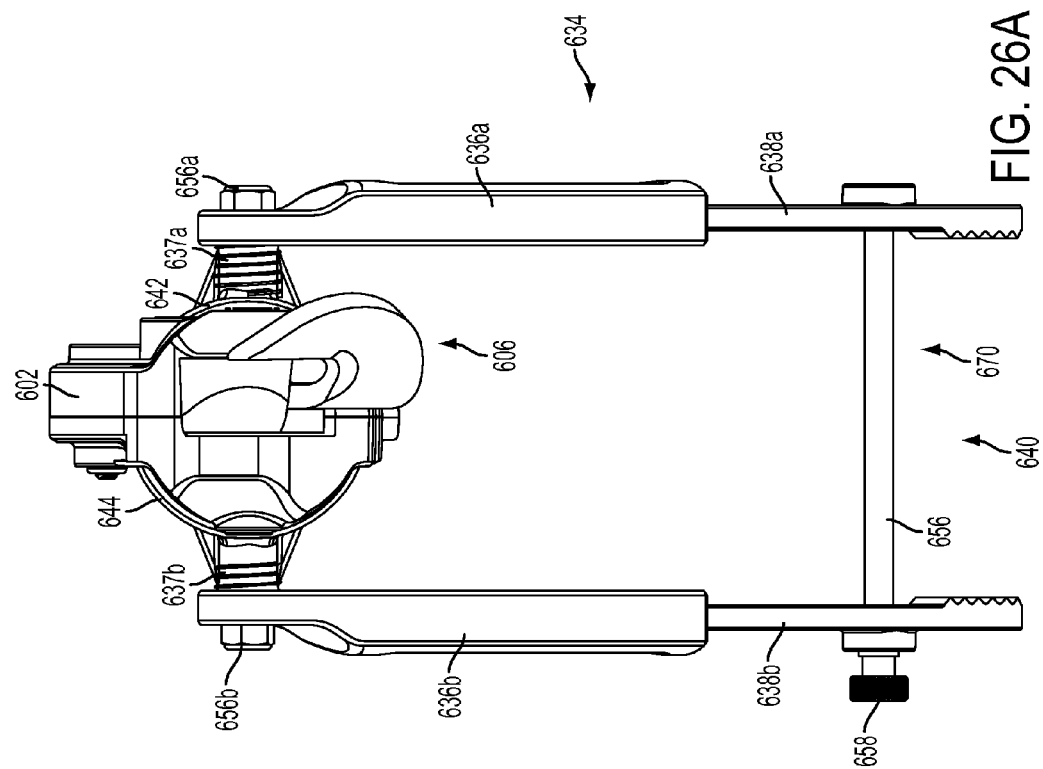

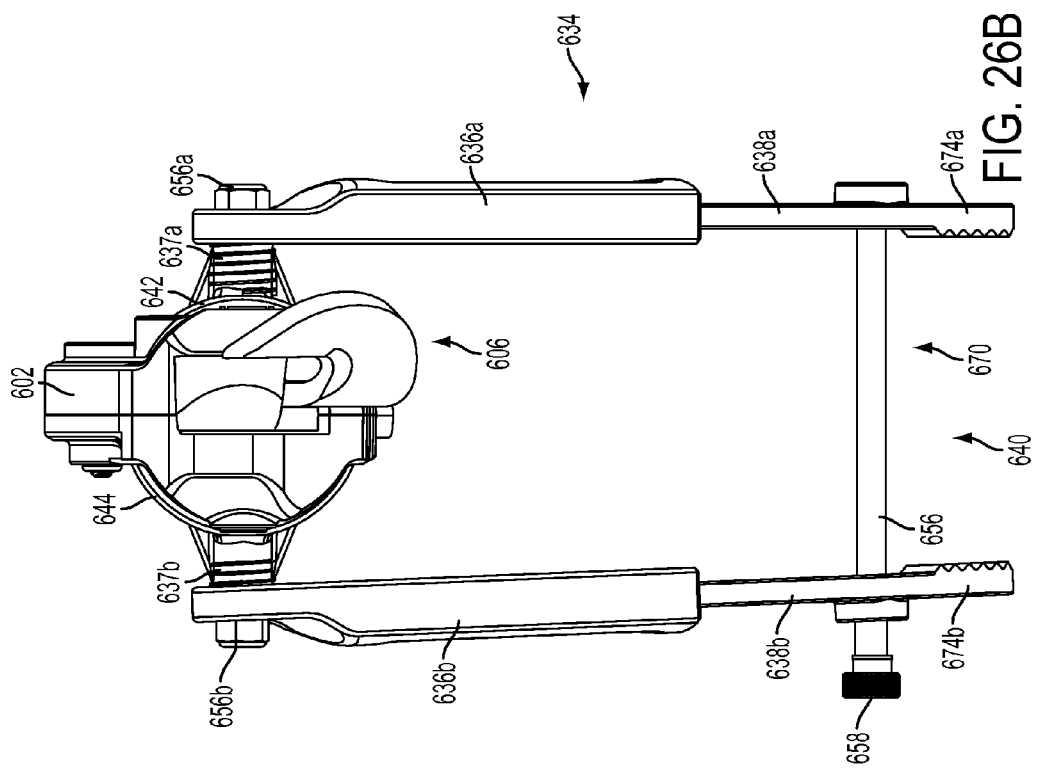

POWER TOOL ACCESSORY WITH BRACE

TECHNICAL FIELD

This application relates to a power tool accessory, such as a shear accessory, with an accessory housing and a brace that removably and rigidly couples the accessory housing to a power tool housing.

BACKGROUND

A known shear accessory for a rotary power tool comprises an accessory housing, shearing blades an input shaft, and transmission coupled to the input shaft and the blades to convert rotary motion of the input shaft to shearing motion of the blades. The input shaft is received in a tool holder of a power tool and is driven in rotation by the power tool to cause shearing motion of the blades. Without sufficient support, the accessory housing will tend to rotate along with the input shaft. Therefore, in one design, the accessory housing may include an external handle to be grasped by the user. However, this makes one handed operation of the tool virtually impossible. Other designs include a brace that can clamp the accessory housing to the power tool housing. However, known braces tend to be bulky, expensive, and difficult to attach and maneuver.

SUMMARY

In an aspect, a power tool accessory is disclosed for use with a power tool having a tool housing and end effector coupled to the tool housing. The power tool accessory includes an accessory housing, an input shaft coupled to the accessory housing and configured to be coupled to and driven by the end effector, and a working tool coupled to the accessory housing and configured to be driven by the input shaft. A brace is configured to rigidly connect the accessory housing to the power tool housing. The brace includes a collar coupled to the accessory housing, a clamp assembly configured to be rigidly connected to the power tool housing, and an arm assembly connecting the collar to the clamp assembly. The collar is configured to allow selective rotation of the accessory housing relative to the collar while the brace rigidly couples the accessory housing to the power tool housing.

Implementations of this aspect may include one or more of the following features. The working tool may include shearing blades, wherein at least one blade moves in a scissor-like manner to cut a workpiece. The collar may include a locking element having a locked configuration in which the accessory housing is rigidly fixed to the collar and an unlocked configuration in which the accessory housing is rotatable relative to the collar. The locking element may comprise a rotatable knob with a threaded stem that is configured to releasably engage the accessory housing. The collar may include a frictional engaging member configured to retain the accessory housing in a desired rotational position relative to the collar and to allow the accessory housing to be rotated relative to the collar upon application of a sufficient rotational torque to the accessory housing. The frictional engaging member may include an elastomeric ring disposed between the collar and the accessory housing.

The arm assembly may include a first arm portion pivotally coupled to the collar and a second arm portion coupled to the clamp assembly. One of the first arm portion and the second arm portion may be adjustable relative to the other of the first arm portion and the second arm portion to adjust a length of the arm assembly. The arm assembly may be configured to rotate relative to the collar to a storage position wherein the arm assembly extends along the accessory housing.

The clamp assembly may include a bracket configured to be removably coupled to the base. The bracket may include a first leg configured to face a first side of the base, a second leg configured to face a second side of the base, and a threaded member configured to draw the legs toward one another. The clamp assembly alternatively may include one of a U-shaped brace, a cup-shaped bracket, and a hook shaped bracket, which are configured to be removably coupled to the power tool housing.

In another aspect, a power tool accessory is disclosed for use with a power tool having a tool housing, a handle, and an end effector. The power tool accessory includes an accessory housing defining a working axis, an input shaft coupled to the accessory housing and configured to by driven by the end effector, a working tool coupled to the accessory housing and configured to be driven by the input shaft, and a brace including a single arm and a clamp assembly. The single arm includes a first arm portion pivotally coupled to the accessory housing and a second arm portion configured to be coupled to a clamp assembly. The clamp assembly is configured to be coupled to a base of the handle of a power tool with the single arm at an angle to the working axis so that the brace rigidly couples the accessory housing to the power tool housing.

Implementations of this aspect may include one or more of the following features. One of the first arm portion and the second arm portion may be adjustable relative to the other of the first arm portion and the second arm portion to adjust a length of the single arm. The one of the first arm portion and the second arm portion may telescope relative to the other of the first arm portion and the second arm portion. The clamp assembly may include a bracket configured to be removably coupled to the base. The bracket may include a first leg configured to face a first side of the base, a second leg configured to face a second side of the base, and a threaded member configured to draw the legs toward one another. At least one of the first leg and the second leg may include at least one of ridges, protrusions, and a spike. The bracket may include a threaded fastener received configured to be received in a threaded opening in the base of the power tool housing. The first arm portion may be pivotally coupled to the accessory housing by a collar that is pivotally coupled to the first arm portion and that is coupled to a rear end portion of the accessory housing. The working tool may include shearing blades, wherein at least one blade moves in a scissor-like manner to cut a workpiece.

In another aspect, a power tool accessory is disclosed for use with a rotary power tool. The power tool accessory includes an accessory housing having a front end wall defining an opening, a rear wall defining an opening, and a pair of opposed sidewalls. An input shaft is at least partially received in the accessory housing and rotatably drivable by a rotary power tool. First and second cutting shears at least partially extend from the accessory housing through the opening. A transmission is connected to the input shaft and to at least one of the first and second cutting shears. The transmission is configured to convert rotational motion of the input shaft to shearing motion of the at least one of the first and second cutting shears. A plate is coupled to an exterior wall of the accessory housing adjacent to the first and second cutting shears. The plate is harder than the accessory housing.

Implementations of this aspect may include one or more of the following features. The cutting shears may be curved toward one of the sidewalls and the plate may wrap at least partially around the one of the sidewalls. The plate may comprise a metal material and the accessory housing may comprise a plastic material.

Advantages may include one or more of the following. The brace is less cumbersome and easier to attach and maneuver with single handed operation. Using a single arm brace enables both left and right handed operation of the accessory. The clamp assembly may be easily but securely attached to the power tool housing. The pivoting arm with adjustable length enables the brace to be coupled to a variety of different power tool housing configurations. The accessory housing can be selectively rotated relative to the brace while the brace is securely attached to the power tool housing to enable the orientation of the blades to be adjusted without removing the accessory from the power tool housing. The hard metal plate on the exterior of the accessory housing prevents debris from the workpiece from damaging the accessory housing. These and other advantages and features will be apparent from the description, the drawings, and the claims.

BRIEF DESCRIPTION OF THE DRAWINGS

FIG. 12 is a close up perspective view of one leg of the clamp assembly of FIG. 11.

FIGS. 13A and 13B are perspective views of the power tool accessory of FIG. 1 with the clamp assembly in unlocked and locked positions, respectively.

FIGS. 20A-20C are perspective views of the power tool accessory of FIGS. 19A and 19B with the arm assembly in different positions.

FIG. 23 is a perspective view of a sixth embodiment of a power tool accessory and a power tool.

FIGS. 25A and 25B are perspective views of the power tool accessory of FIG. 23 with the arm assembly in different positions.

FIGS. 26A and 26B are front views of the power tool accessory of FIG. 23 with the clamp assembly in unlocked and locked positions, respectively.

DETAILED DESCRIPTION

Figure 1:
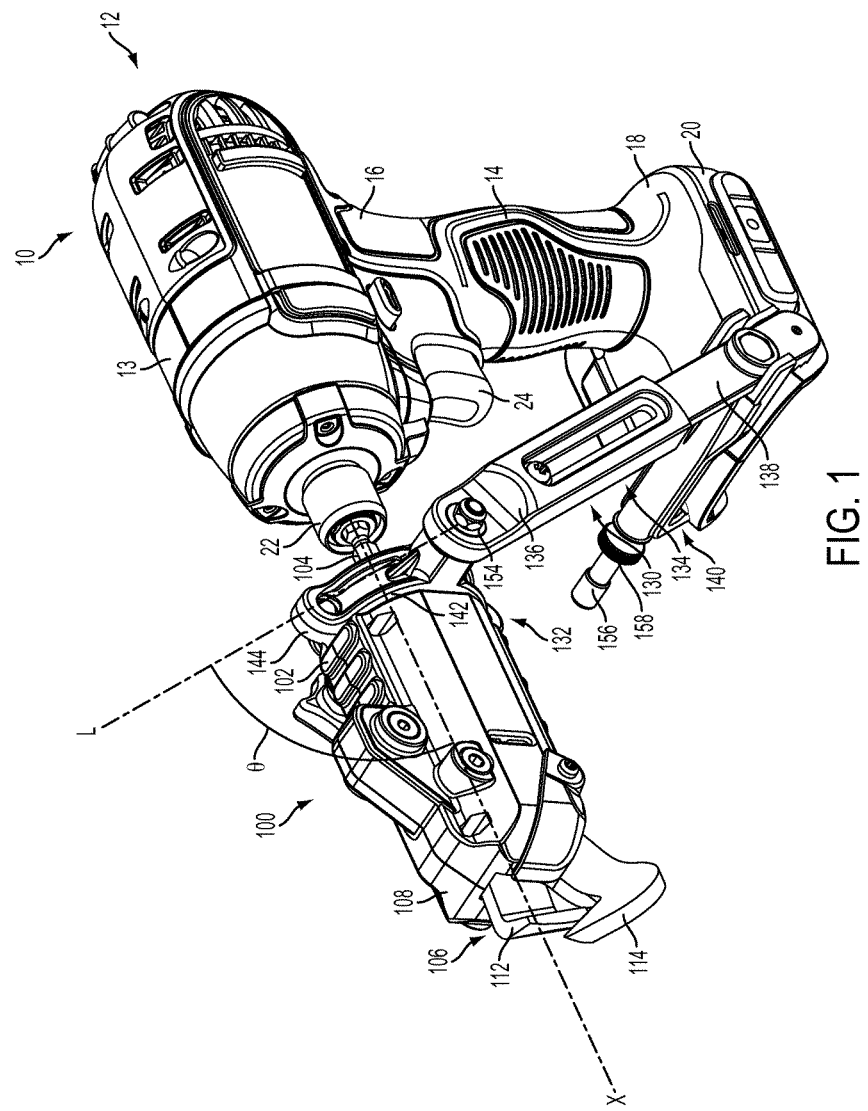
FIG. 1 is a perspective view of a first embodiment of a power tool accessory and a power tool.

Referring to FIGS. 1-13B, a first embodiment of a power tool accessory 100 is removably coupled to a power tool 10. The power tool 10 includes a power tool housing 12 having a motor and transmission housing 13 that contains a motor and a transmission (not shown) and a handle 14. The handle 14 has a top end 16 coupled to the motor and transmission housing 13 and a base 18 away from the motor and transmission housing 13. The base 18 may include a battery receptacle 20 configured to receive a removable battery pack. An end effector 22 (e.g., a tool bit holder) extends from the motor and transmission housing 13 and may be partially received in the motor and transmission housing 13. The end effector 22 is coupled to the transmission so that the motor imparts rotary motion to the end effector 22. A trigger switch 24 is coupled to the housing 12 and is actuatable by a user to control power delivery from a power source, such as a battery pack, to the motor.

Figure 2:
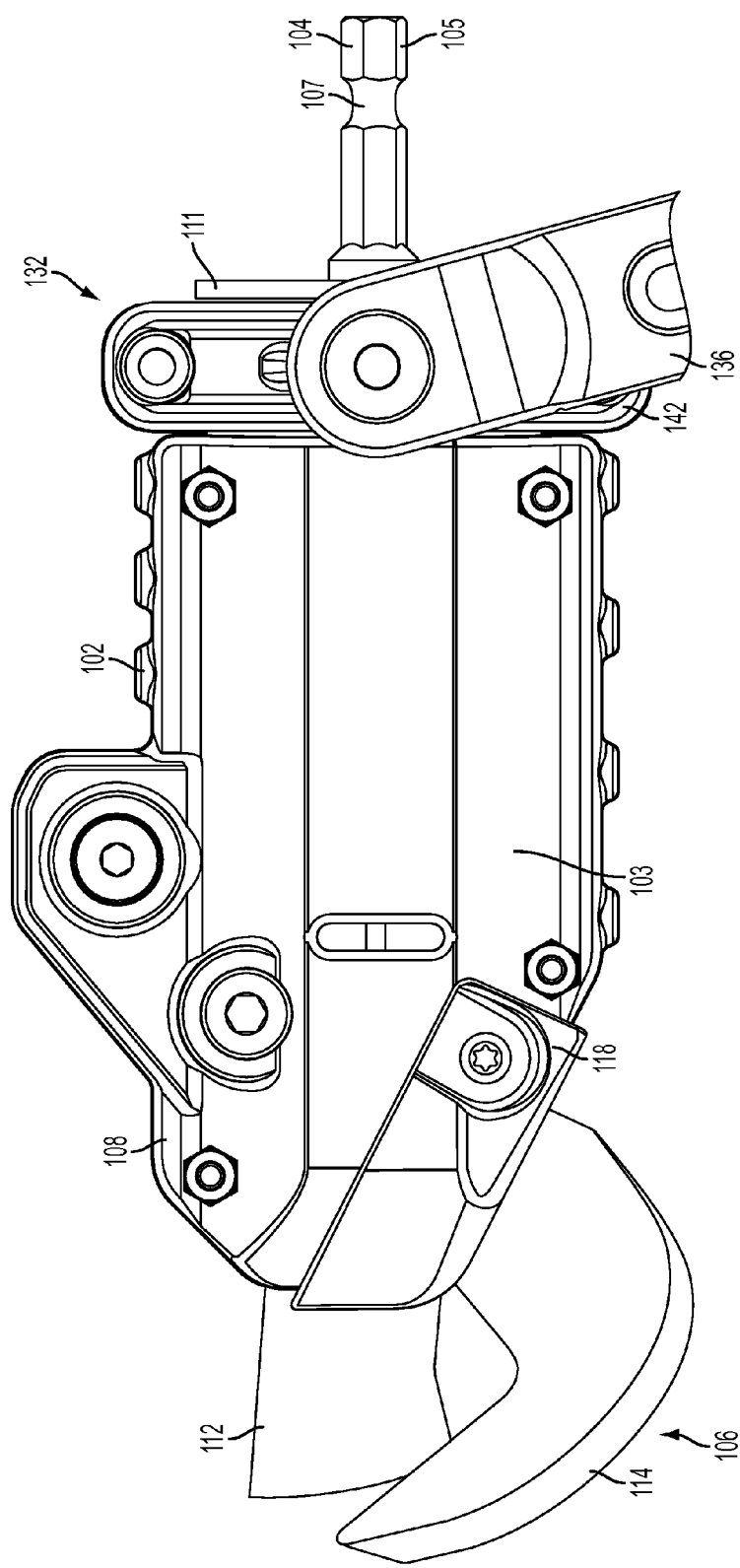
FIG. 2 is a side view of the power tool accessory of FIG. 1.
Figure 3:
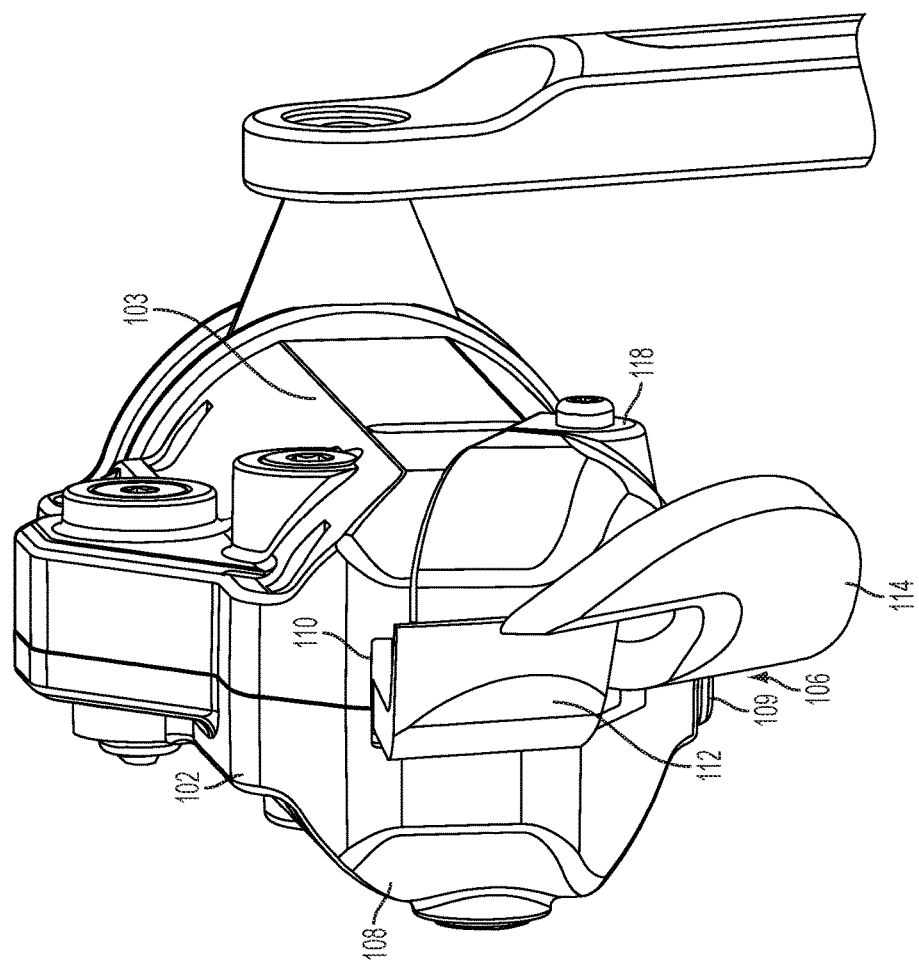
FIG. 3 is a front view of the power tool accessory of FIG. 1.

The power tool accessory 100 includes an accessory housing 102 and an input shaft 104 at least partially received in a rear end 111 of the accessory housing 102. The input shaft 104 is receivable in the end effector 22 so that the input shaft 104 is rotationally driven by rotational movement of the end effector 22. As shown in FIGS. 2-3, in one embodiment, the input shaft 104 includes a hex shaped shank 105 with an annular groove 107 for being received in the end effector 22 in the form of a quick release bit holder or a chuck.

Figure 4:
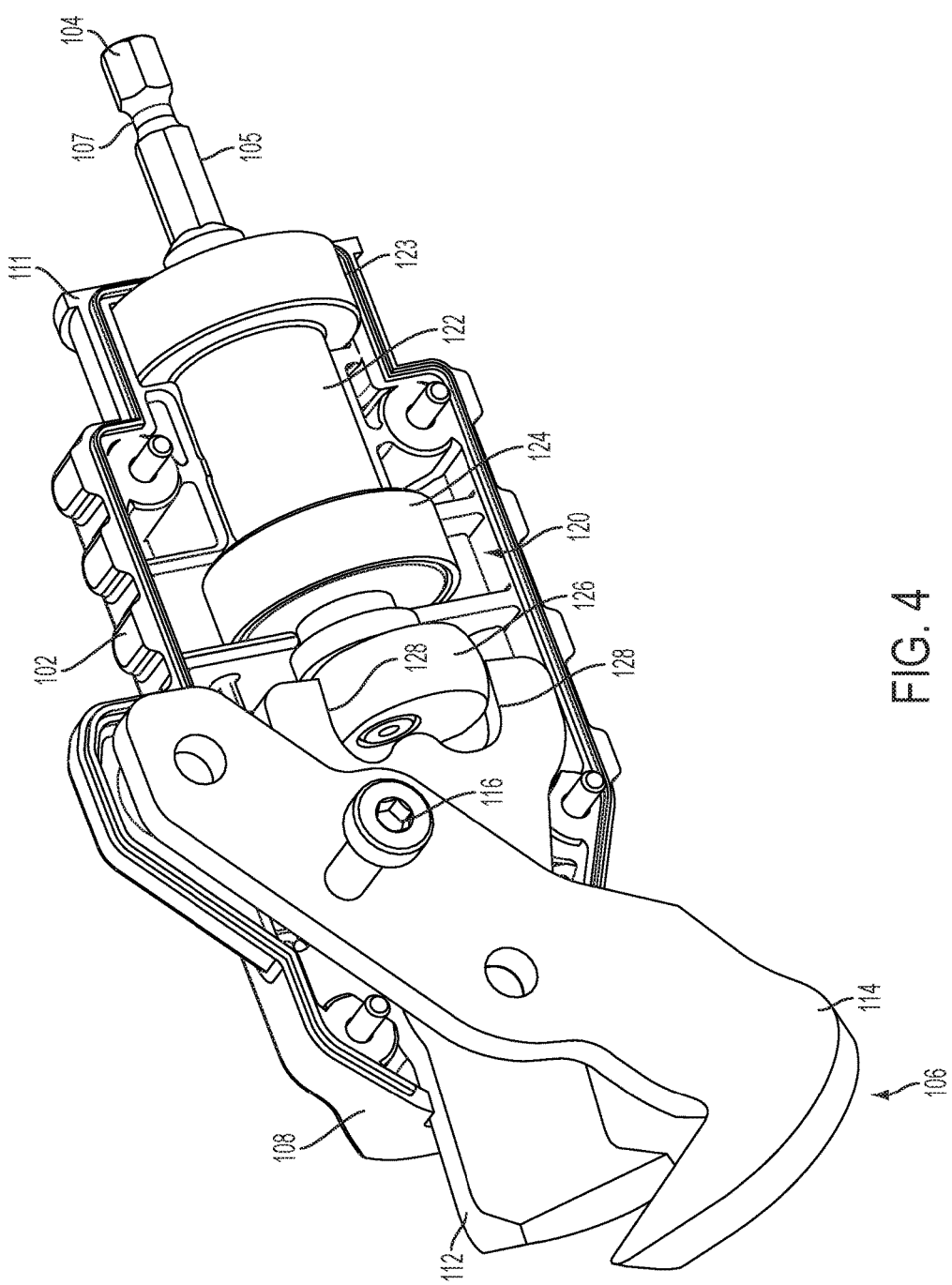
FIG. 4 is a perspective cutaway view of the power tool accessory of FIG. 1.

The power tool accessory 100 also includes a working tool 106 at least partially received in the accessory housing 102 and that extends at least partially outward from a slot 110 in a front end 108 of the accessory housing 102. As shown in FIG. 4, in one embodiment, the working tool 106 includes a first stationary shear 112 that is rigidly mounted to the accessory housing 102, and a second moveable shear 114 that is pivotally mounted in the accessory housing 102. The moveable shear 114 can pivot relative to the stationary shear 112 to effect a scissor-like cutting action. The stationary shear 112 and the moveable shear 114 are each curved toward a first sidewall 103 of the accessory housing 102. A metal plate 118 is coupled to the first sidewall 103 and wraps around at least a portion of a bottom wall 109 of the accessory housing 102. The metal plate 118 prevents sheared material from a workpiece from marring the accessory housing 102, which may be composed of a plastic or a softer metal material.

As shown in FIG. 4, the power tool accessory 100 also includes a transmission 120 that couples the input shaft 104 to the working tool 106 and that converts rotational motion of the input shaft 104 to pivotal movement of the moveable shear 114 about a pivot pin or nut and bolt 116. The transmission 120 includes a rotational shaft 122 rigidly connected to the input shaft 104 supported by a pair of bearings 123, 124, and an eccentric driving member 126 that is eccentrically mounted to the shaft 122. The eccentric driving member 126 is received in a forked recess 128 formed in a rear end of the moveable shear 114. In use, rotation of the input shaft and the rotational shaft 122 causes the eccentric to rotate about its eccentric axis. This in turn causes the moveable shear 114 to pivot about the pivot pin or nut and bolt 116. Thus, the rotary motion of the input shaft 104 is converted to a shearing motion of the moveable shear 114 relative to the stationary shear 112 to effect a cutting action of a workpiece.

The power tool accessory 100 further includes a brace 130 that is configured to adjustably and rigidly couple the accessory housing 102 to the power tool housing 12. The brace 130 includes a collar 132 coupled to a rear end 111 of the accessory housing 102, a clamping assembly 140 configured to be removably attached to the base 18 of the handle 14 of the power tool housing 12, and an arm assembly 134 coupled at one end to the collar 132 and at an opposite end to the clamping assembly 140.

Figure 5:
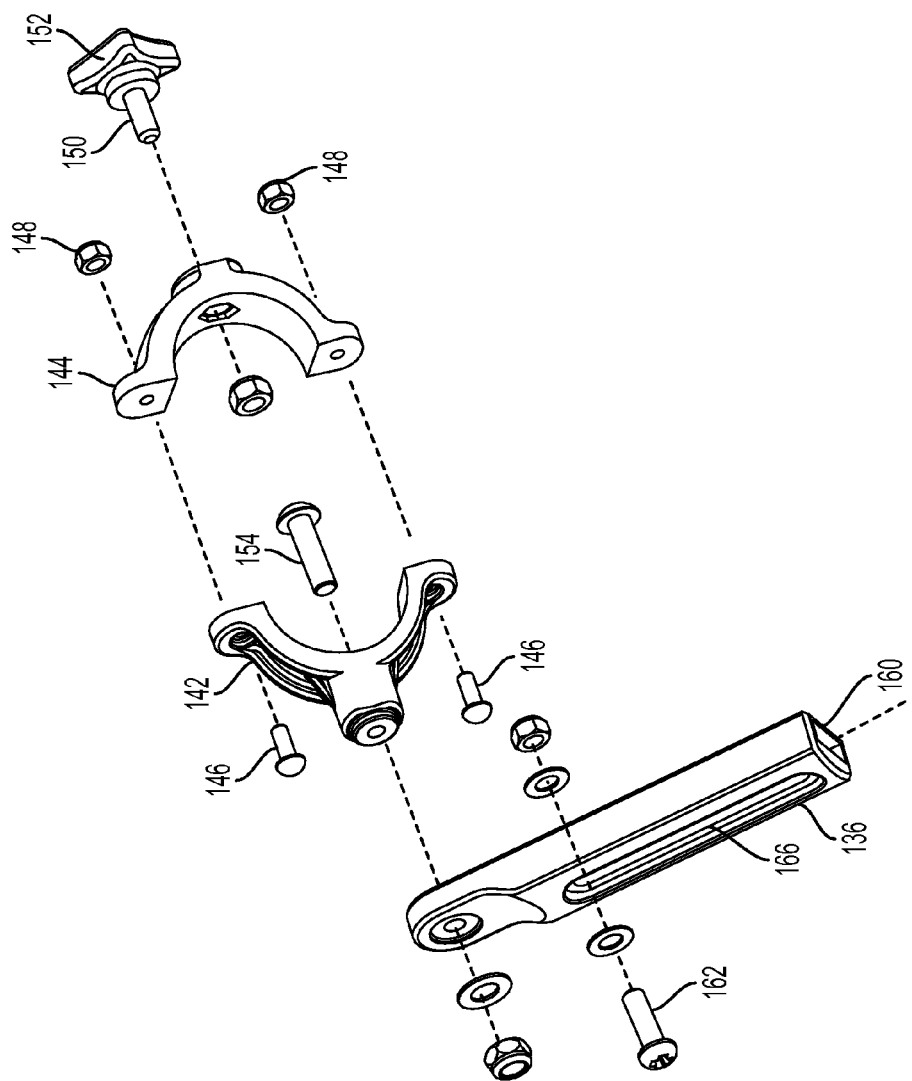
FIG. 5 is an exploded view of the collar and arm assembly of the power tool accessory of FIG. 1.
Figure 6:
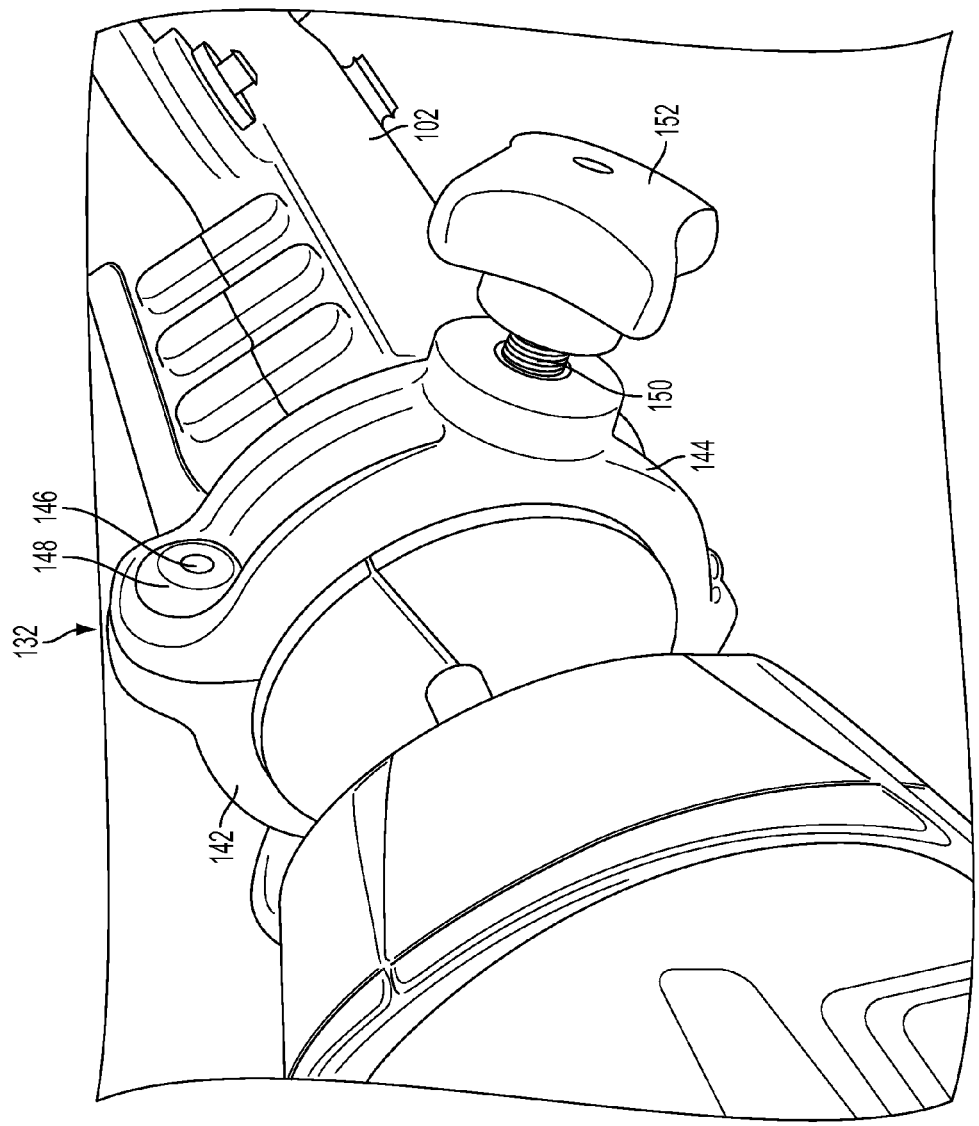
FIG. 6 is a close-up rear perspective view of the power tool accessory of FIG. 1.
Figure 7B:
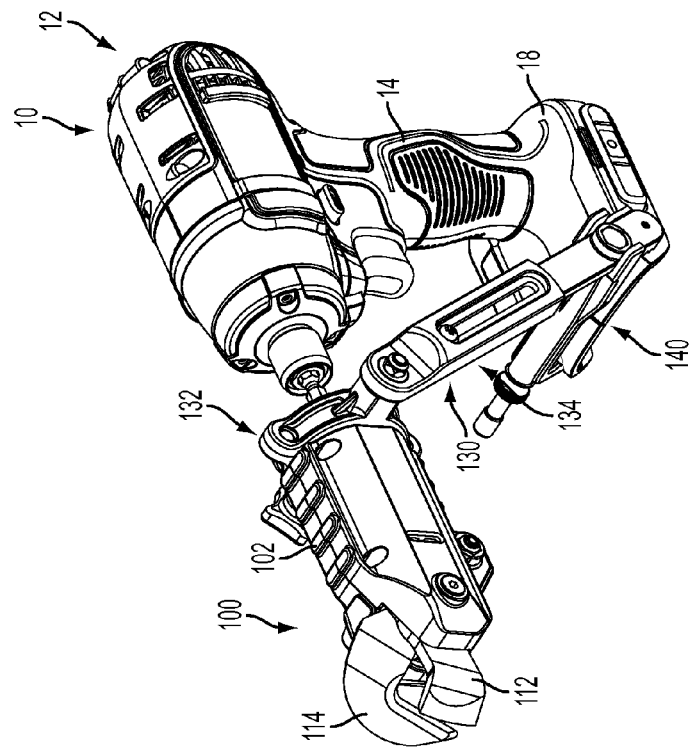
FIGS. 7A and 7B are perspective views of the power tool accessory and power tool of FIG. 1 with the accessory housing in different rotational positions.
Figure 7A:
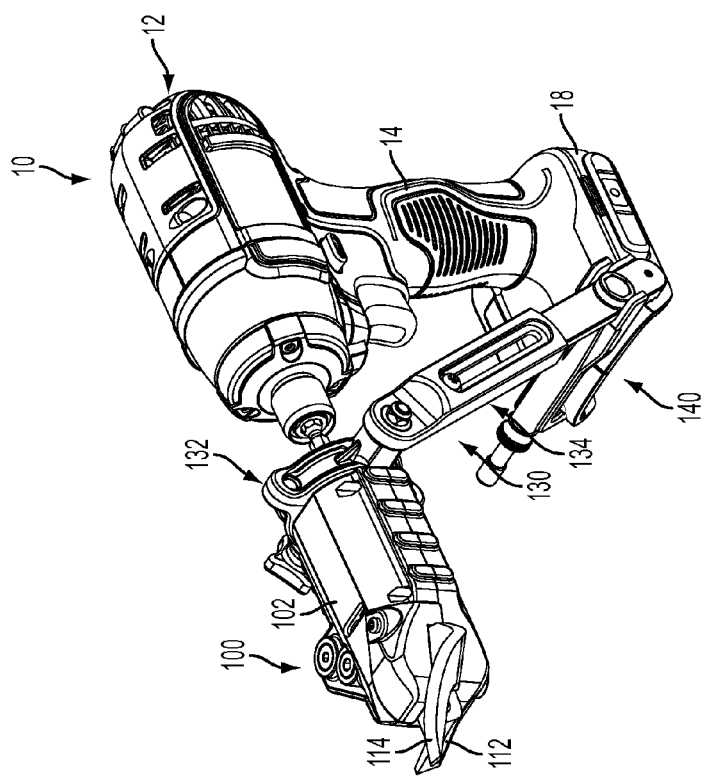

As shown in FIGS. 1, 5, and 6, the collar 132 includes a first concave ear 142 and a second concave ear 144 that are connected to one another by screws 146 and nuts 148. The first concave ear 142 and the second concave ear 144 are positioned on left and right sides of the accessory housing 102, respectively. The ears 142, 144 loosely surround the accessory housing 102 so that the accessory housing 102 can rotate relative to the collar 132. A knob 152 with a threaded stem 150 is coupled to the second concave ear 144 with the threaded bolt extending radially inward through an aperture in the second concave ear 144. The knob 152 and the threaded stem 150 can be rotated between a locked position and an unlocked position. In the locked position, the threaded stem 150 engages the accessory housing 102 to prevent rotation of the accessory housing 102 relative to the collar 132. In the unlocked position, the threaded stem 150 does not engage the accessory housing 102 to allow rotation of the accessory housing 102 relative to the collar 132. As shown in FIGS. 7A and 7B, this enables the accessory housing 102 to be rotated and locked in a plurality of different rotational positions relative to the collar 132 and the power tool 10 while the brace 130 rigidly attaches the accessory 100 to the power tool housing 12. Thus, the accessory 100 can be used to make cuts in a plurality of different directions without changing the orientation of the power tool 10.

In other embodiments, the rear end 111 of the accessory housing 102 may include a plurality of recesses that receive the threaded stem 150 to provide indexed rotational adjustment of the accessory housing 102 relative to the collar 132. The threaded stem 150 may alternatively or additionally be replaced with a spring biased pin, ball, or detent that engages recesses in the accessory housing 102 to provide a quick-release indexed rotational adjustment of the angular position of the accessory housing 102 relative to the collar 132. Other embodiments that enable indexed rotational adjustment of the accessory housing 102 relative to the collar 132 can be found, for example, in FIGS. 9A-16 and 35 of U.S. patent application Ser. No. 14/186,088, filed Feb. 21, 2014, which is incorporated by reference in its entirety.

Referring to FIGS. 1, 5, and 8-9, the arm assembly 134 includes a first arm portion 136 and a second arm portion 138. The first arm portion 136 is pivotably attached to the collar 132 by a pivot pin 154 that extends radially outward from the first ear 142. Referring also to FIGS. 10A and 10B, the pivotal connection between the first arm portion 136 and the collar 132 enables the arm assembly 134 to be pivoted relative to the accessory housing 102 to clamp different portions of the power tool, and allows the arm assembly 134 to be folded along the length of the accessory housing 102 for storage (as shown in FIG. 10A). The second arm portion 138 is telescopically received in a longitudinal opening 160 in the first arm portion 136. A positioning pin 162 is received in an aperture 164 in the second arm portion 138 and slides in a longitudinal slot 166 in the first arm portion 136. The telescopic connection between the first arm portion 136 and the second arm portion 138 allows the length of the arm assembly 134 to be adjustable by a user. In other embodiments, the longitudinal slot may be configured with bulging recesses and the positioning pin may be spring biased to allow for indexed movement of the second arm portion 138 relative to the first arm portion 136. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

Figure 8:
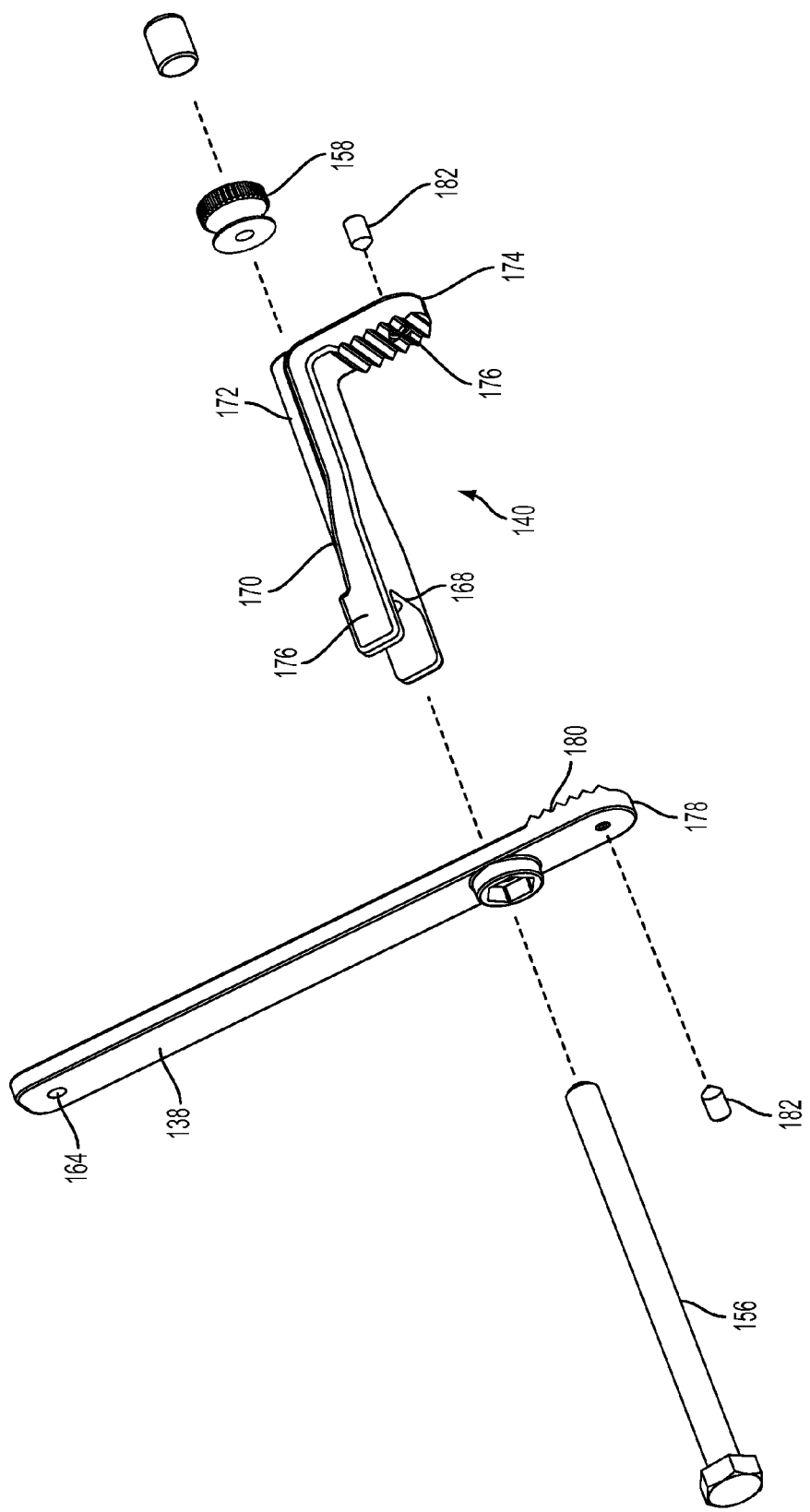
FIG. 8 is an exploded view of the arm assembly and clamp assembly of the power tool accessory of FIG. 1.
Figure 9:
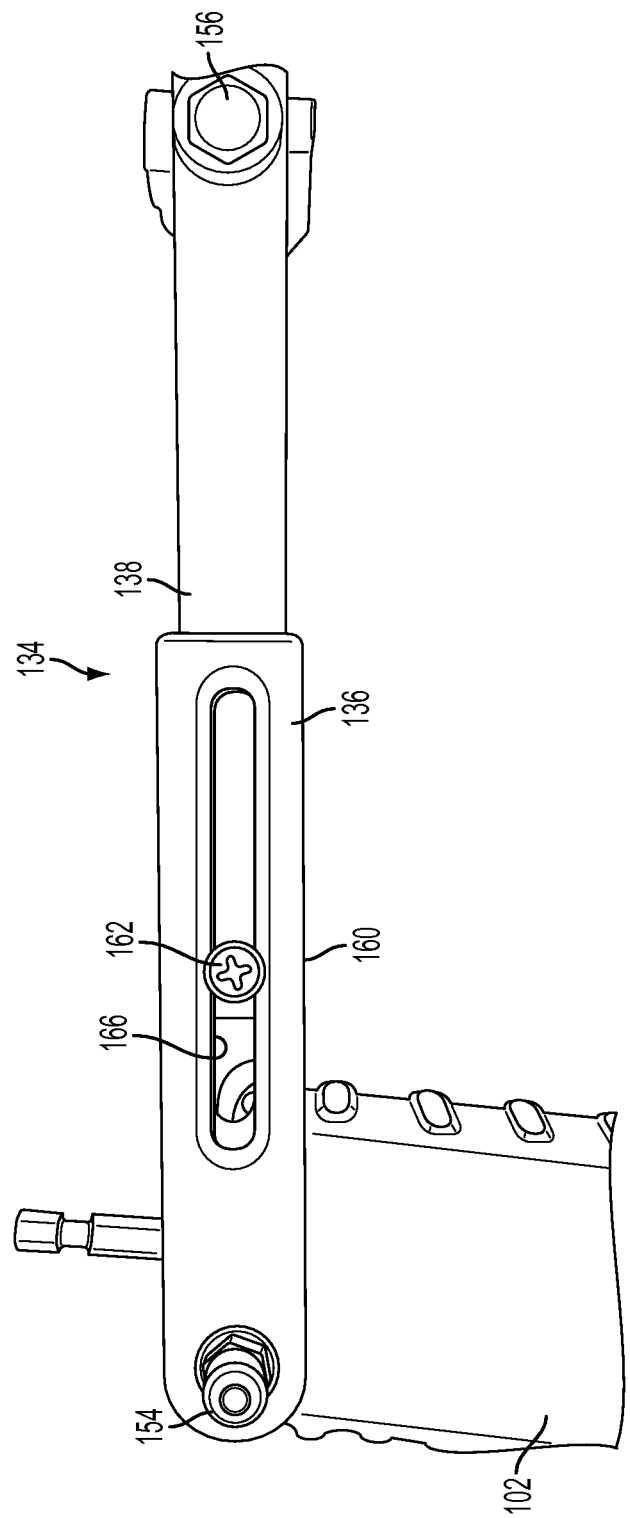
FIG. 9 is a side view of the arm assembly of the power tool accessory of FIG. 1.
Figure 10:
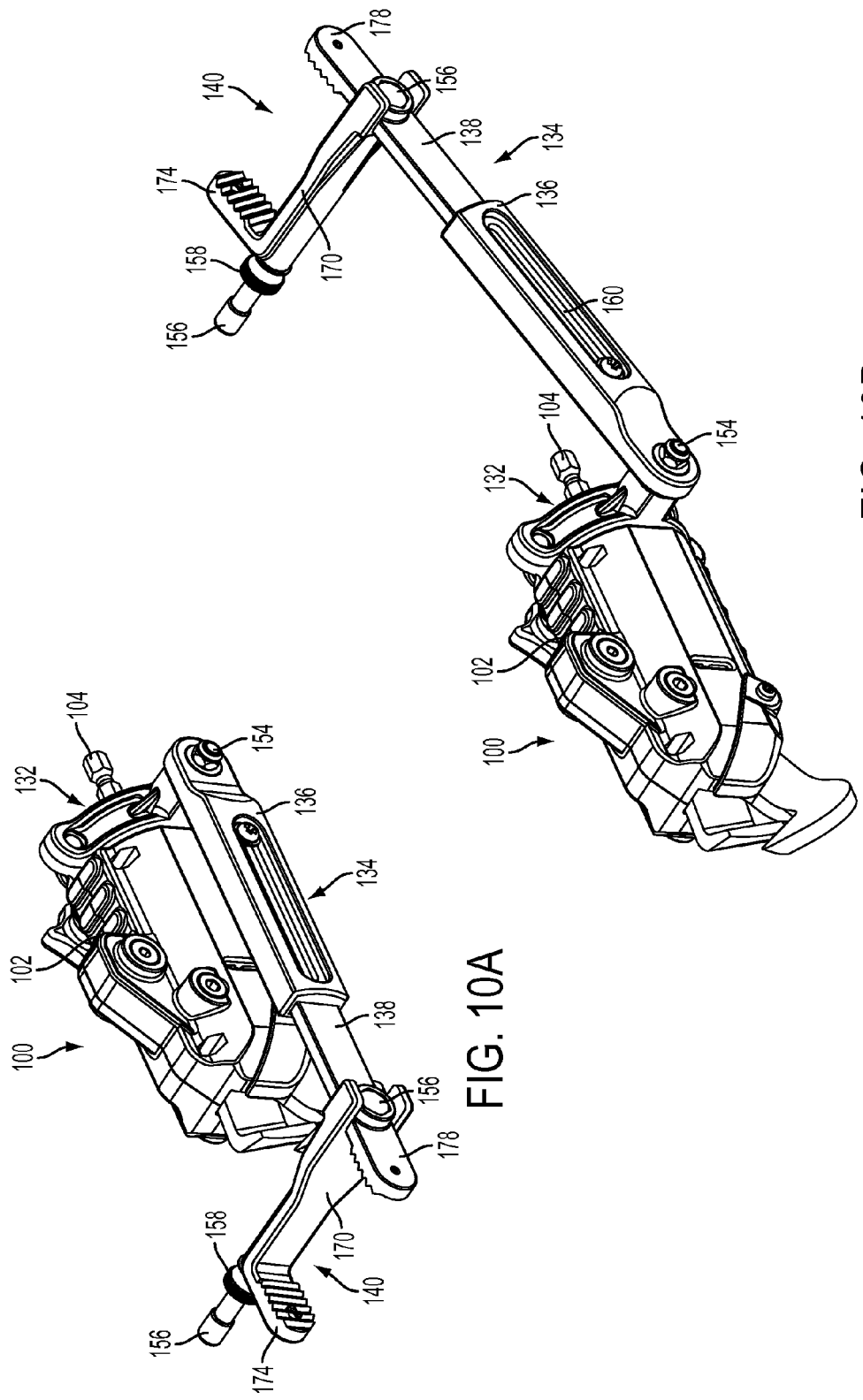
FIGS. 10A and 10B are perspective views of the power tool accessory of FIG. 1 with the arm assembly in different rotational positions.
Figure 11:
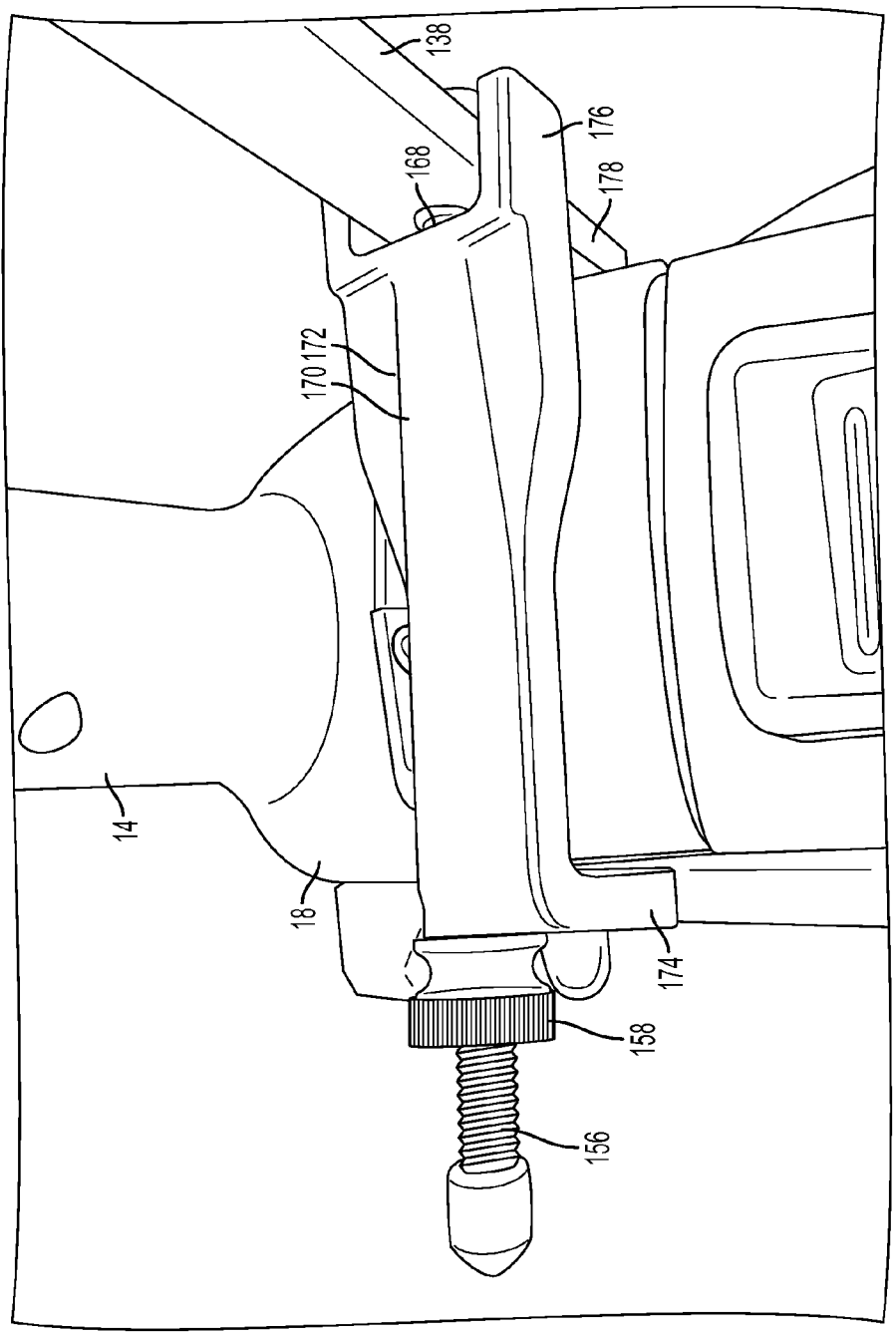
FIG. 11 is a close up view of the clamp assembly of the power tool accessory of FIG. 1 coupled to the power tool housing.

Referring to FIGS. 1, 8, and 11, the clamping assembly 140 includes a bracket 170 that is coupled to the second arm portion 138 by a threaded rod 156 and a locking nut 158. The bracket 170 includes a cross-bar 172 with a first leg 174 connected to one end of the cross-bar 172 in an L-shaped configuration, and a second leg 178 coupled to an end of the second arm portion 138. The cross-bar 172 includes a forked portion 176 that is received around the periphery of the second leg 178 to prevent rotational movement between the second arm portion 138 and the cross-bar 172. The cross-bar 172 defines a central bore 168 that receives the threaded rod 156. The legs 174, 178 each include a plurality of ridges or protrusions 176, 180. Referring also to FIG. 12, the legs 174, 178 may optionally each have a sharp metal spike 182. The ridges or protrusions 176, 180 and the spikes 182 enhance gripping of the power tool housing 12 by the legs 174, 178 of the clamping assembly 140.

Referring also to FIGS. 13A and 13B, the locking nut 158 is moveable between an unlocked position (FIG. 13A) where the legs 174, 178 are disengaged from the tool housing 12, and a locked position (FIGS. 11 and 13B) where the legs 174, 178 tightly engage the tool housing 12. The arm assembly 134 and clamping assembly 140 are configured to enable the legs 174, 178 to firmly grip and tightly engage the base 18 of the handle 14 adjacent to the battery receptacle 20.

When attached to the tool housing 102, the arm assembly 134 and the clamping assembly 140 fix the accessory housing 102 to the tool housing 12 with the arm assembly 134 extending along an arm axis L at an angle θ relative to an output axis X of the power tool. In an embodiment, the angle θ may be approximately 40 degrees to approximately 65 degrees. This configuration allows the working tool 106 to cut a workpiece without the arm assembly 134 interfering with the cutting action. In addition, this configuration enables the accessory housing 102 to be rigidly coupled to the tool housing 12 using an arm assembly 134 having only a single arm. Further, the single arm can be placed on either the left or right side of the tool housing 12 to facilitate left and right handed use of the power tool 10.

In use, first, the first arm portion 136 is unfolded from its storage position (FIG. 10A) to its operation position (FIG. 10B). Second, the locking nut 158 is loosened, which loosens the bracket 170 and allows the legs 174, 178 to move apart from another to their unlocked position (FIG. 13A). Third, first arm portion 136 is pivoted relative to the collar 132 and the second arm portion 138 is longitudinally adjusted relative to the first arm portion 136 so that the legs 174, 178 are received on either side of the base 18 of the handle 14, near the battery receptacle 20. Finally, the locking nut 158 is tightened to tightly clamp the legs 174, 178 of the bracket 170 on the power tool housing 12 in their locked position (FIGS. 1, 11, 13B) This securely attaches the accessory housing 102 to the power tool housing 12. While the brace 130 is securely attaching the accessory housing 102 to the power tool housing 12, the accessory housing 102 may be rotated relative to the collar 132 by loosening the knob 152 and threaded stem 150, rotating the accessory housing 102 to a desired rotational position, and then tightening the knob 152 and threaded stem 150.

Figure 14:
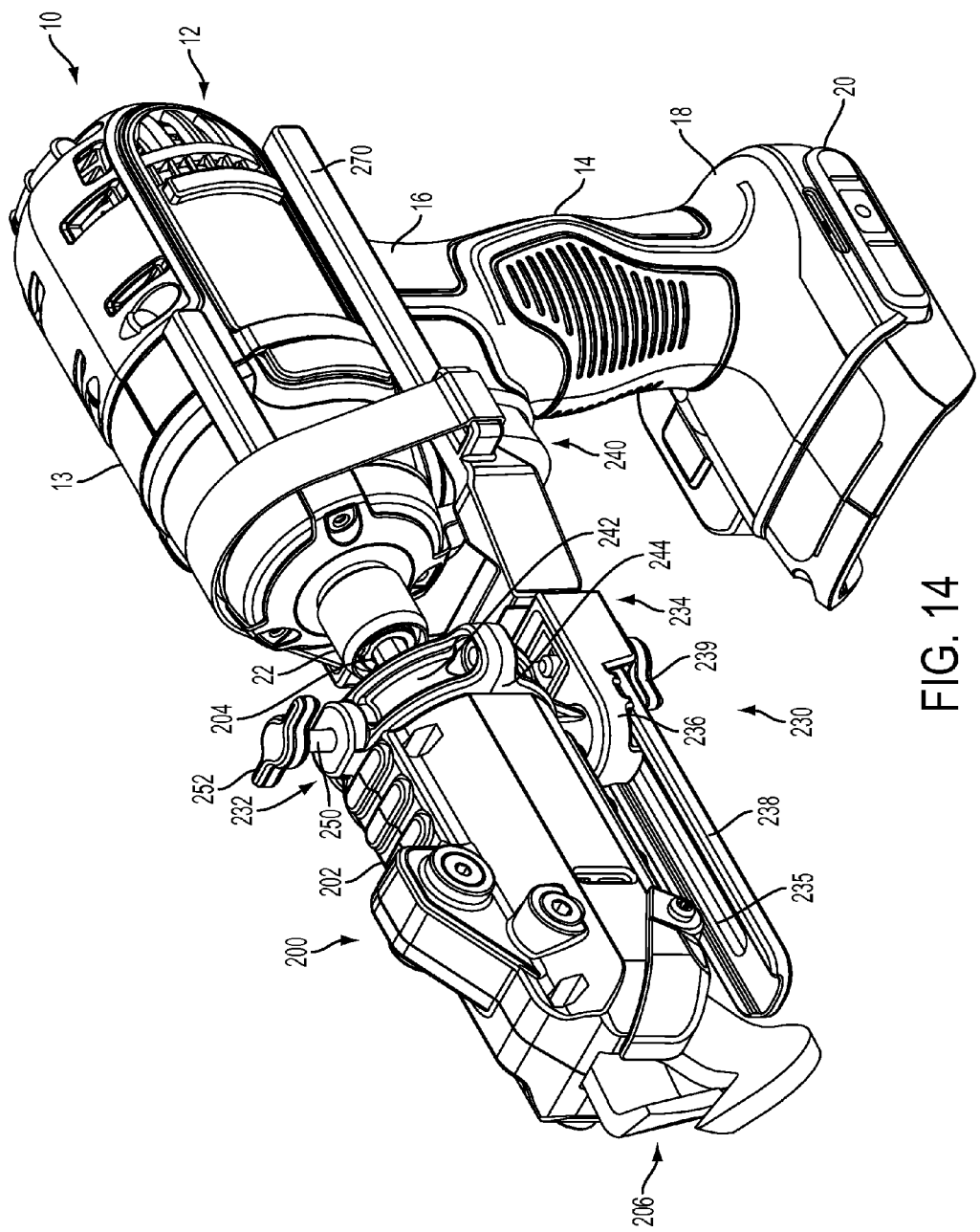
FIG. 14 is a perspective view of a second embodiment of a power tool accessory and a power tool.
Figure 15A:
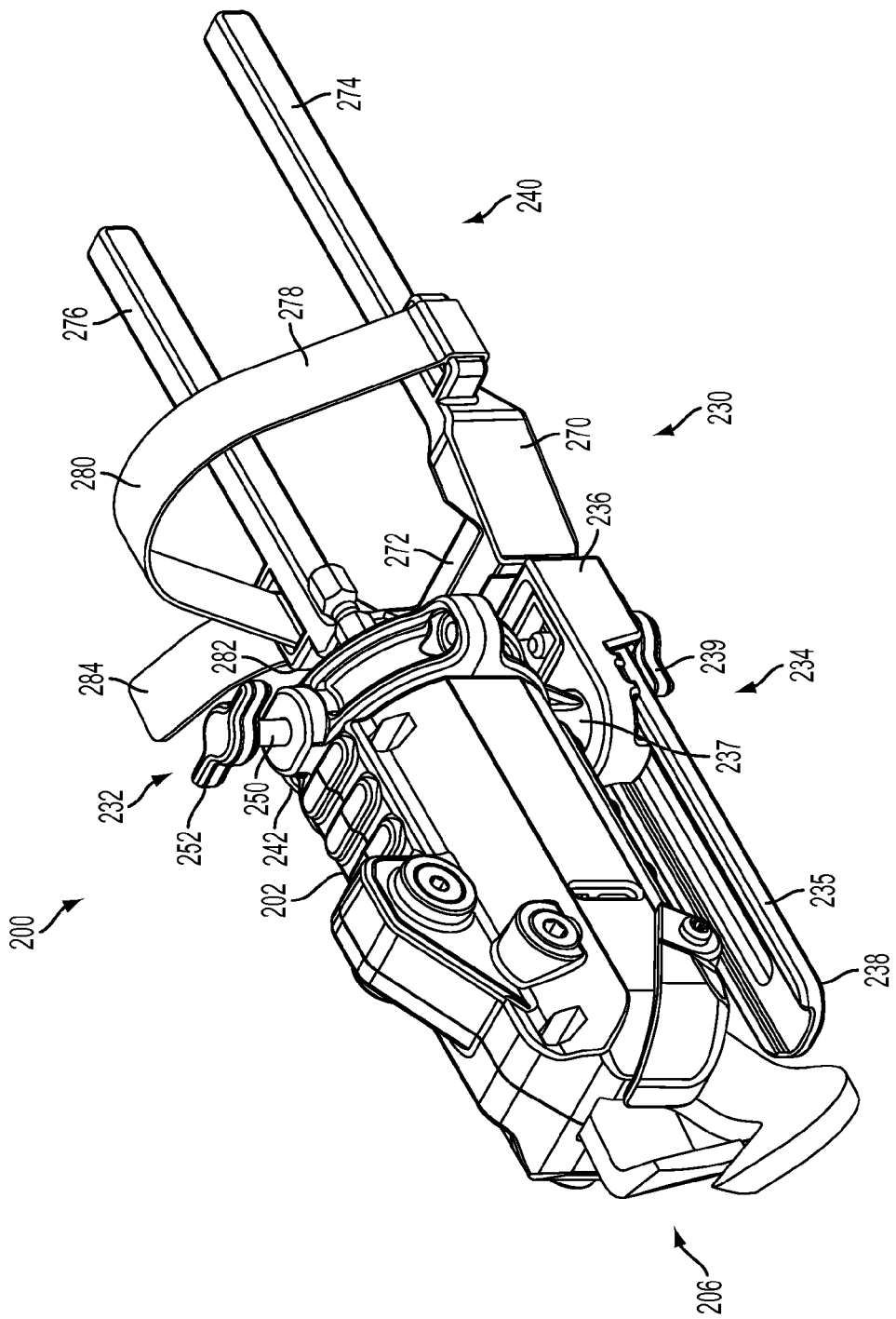
FIGS. 15A-15C are perspective views of the power tool accessory of FIG. 14 with the arm assembly in different positions.
Figure 15B:
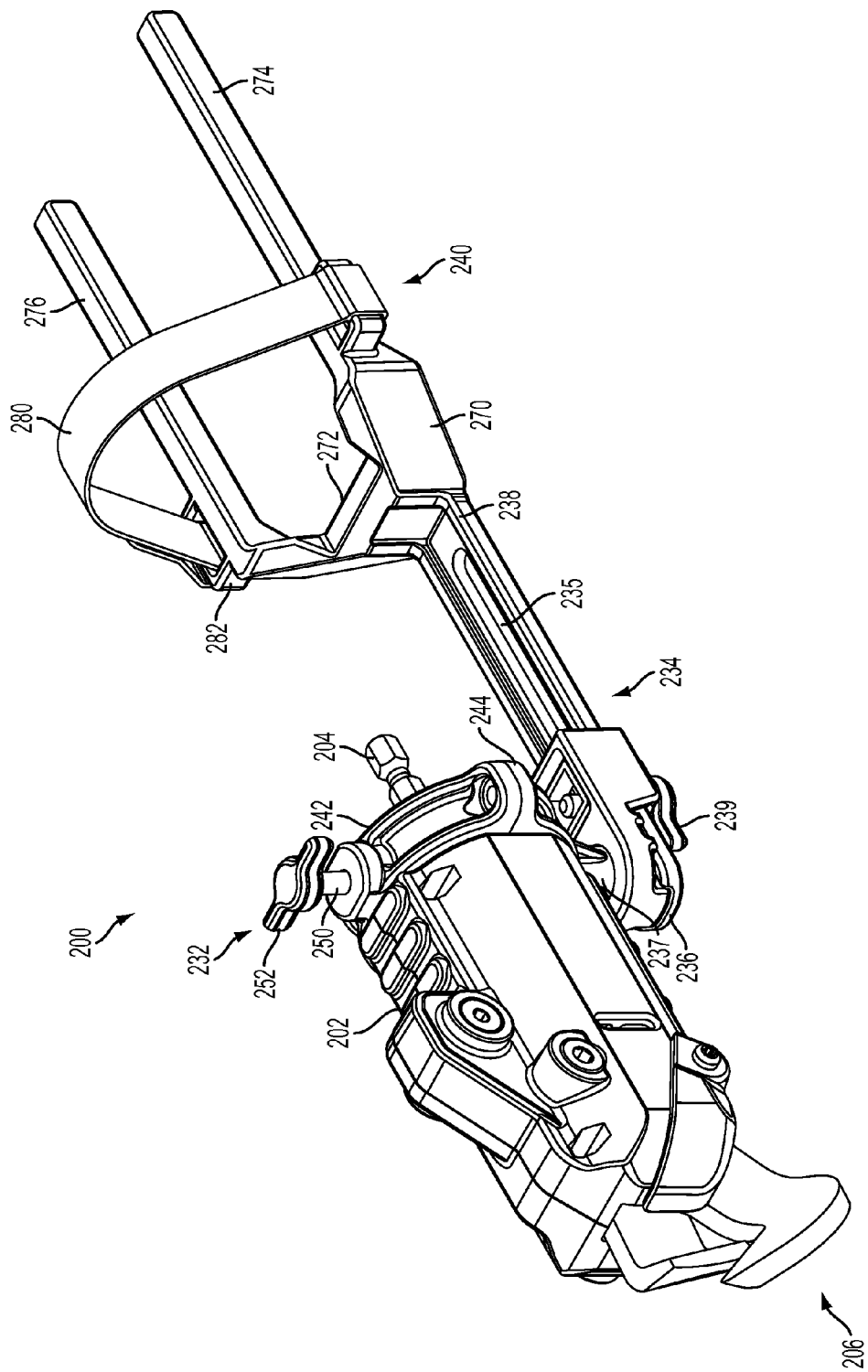
Figure 15C:
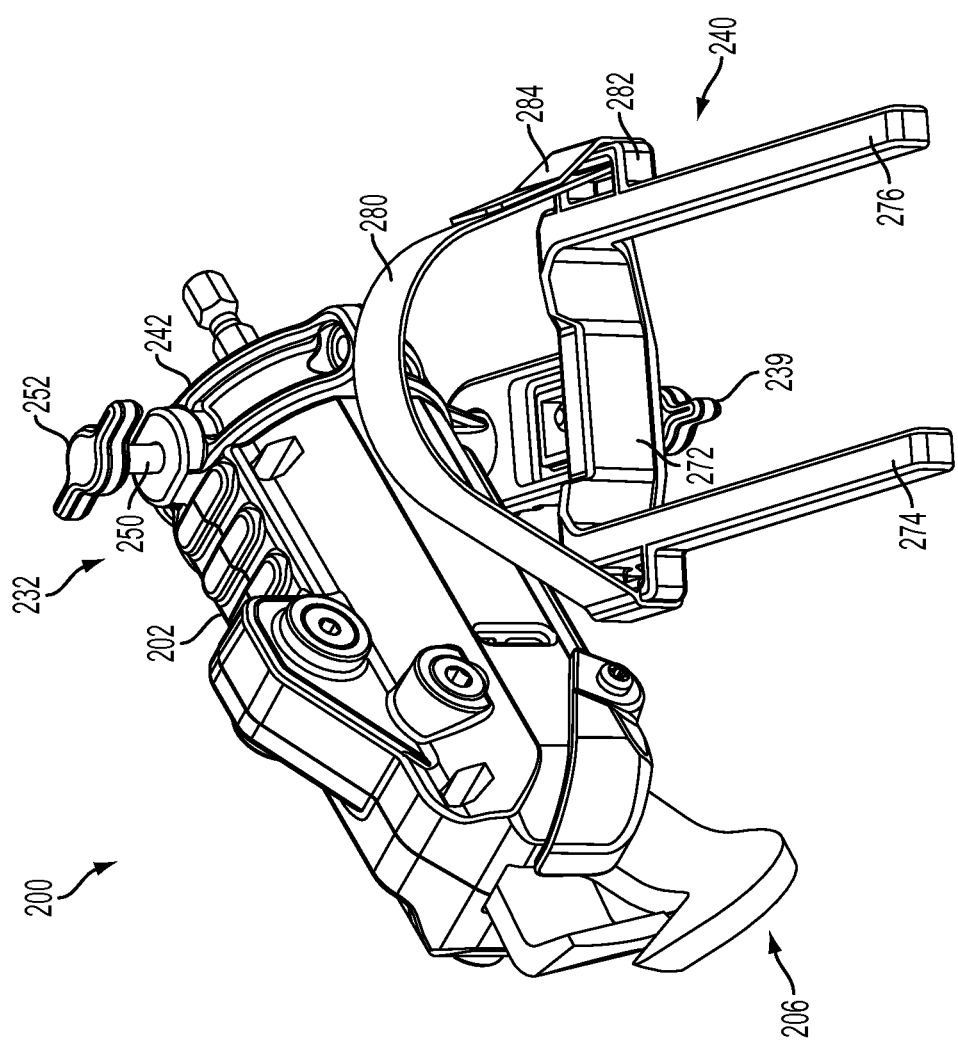
Figure 16:
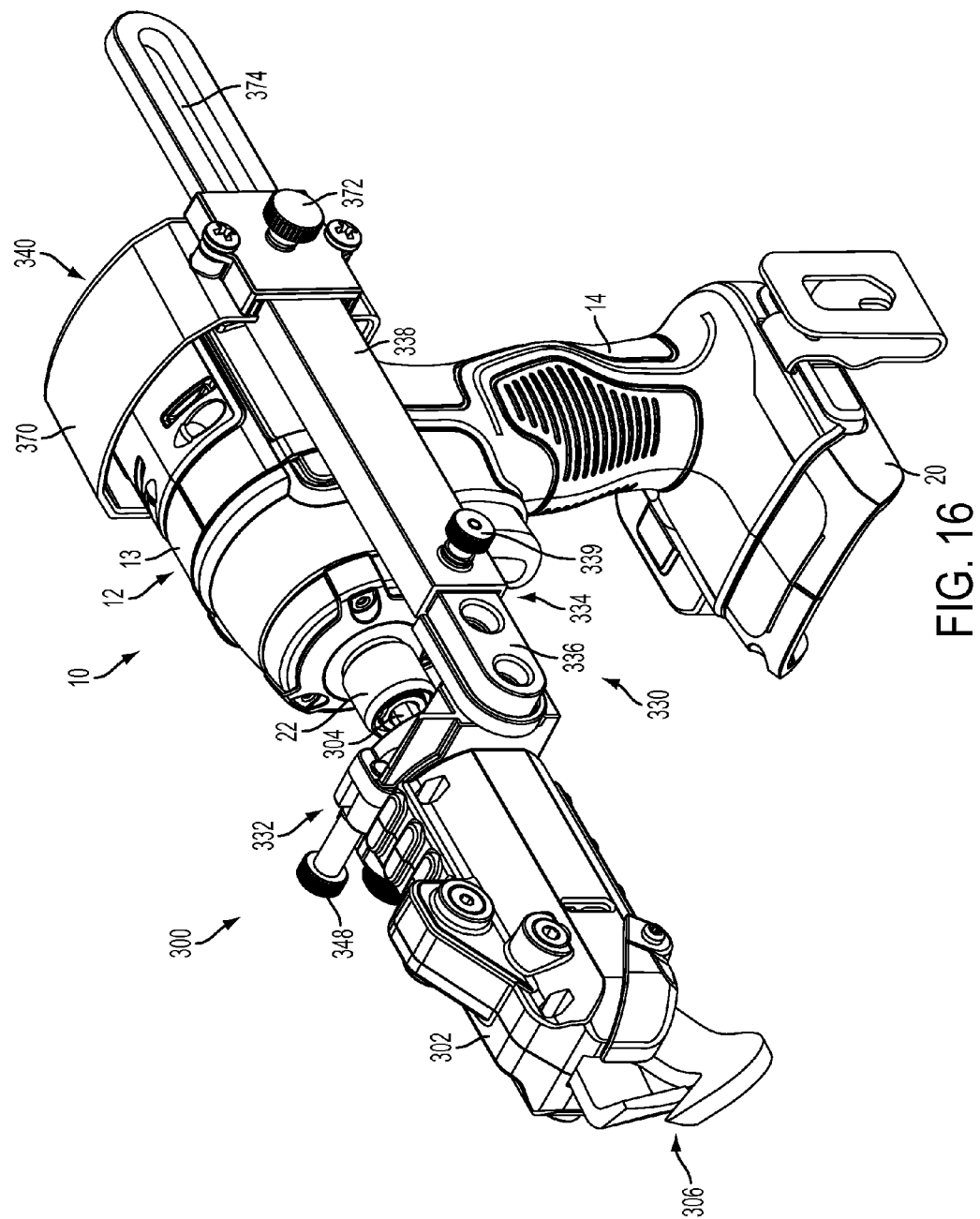
FIG. 16 is a perspective view of a third embodiment of a power tool accessory and a power tool.

Referring to FIGS. 14-15C, a second embodiment of a power tool accessory 200 is removably coupled to the power tool housing 12 of the power tool 10. The power tool accessory 200 includes an accessory housing 202, an input shaft 204, a transmission (inside the accessory housing 202, not shown) and a working tool 206, similar to the accessory housing 102, the input shaft 104, the transmission 120, and the working tool 106 of the first embodiment. The power tool accessory 200 also includes a brace 230 configured to adjustably and rigidly couple the accessory housing 202 to the power tool housing 12. The brace 230 includes a collar 232 coupled to the accessory housing 202, a clamping assembly 240 configured to be removably attached to the motor and transmission housing 13 of the power tool housing 13, and an arm assembly 234 coupled at one end to the collar 232 and at an opposite end to the clamping assembly 240. The brace 230 differs from the brace 130 of the first embodiment, as described in greater detail below.

The collar 232 is similar in structure to the collar 132 of the first embodiment. The collar 232 includes a first concave ear 242 and a second concave ear 244 connected to each other by screws and nuts and loosely surrounding the accessory housing 202 so that the accessory housing 202 can rotate relative to the collar 232. Unlike the concave collar 132, the concave collar 232 are configured so that the first concave ear 242 is coupled to the top circumferential half of the accessory housing 202, and the second concave ear 244 is coupled to the bottom circumferential half of the accessory housing 202. A threaded stem 250 and knob 252 are coupled to the first concave ear 244 and can be rotated between a locked position and an unlocked position. In the locked position, the threaded stem 250 engages the accessory housing 202 to prevent rotation of the accessory housing 202 relative to the collar 232. In the unlocked position, the threaded stem 250 does not engage the accessory housing 202 to allow the accessory housing 202 to be rotated relative to the collar 232. This enables the accessory housing 202 to be locked in a plurality of different rotational positions relative to the power tool 10 while the brace 230 rigidly attaches the accessory 200 to the power tool housing 12. Thus, the accessory 200 can be used to make cuts in a plurality of different directions without changing the orientation of the power tool 10.

In other embodiments, the rear end of the accessory housing 202 may include a plurality of recesses that receive the threaded stem 250 to provide indexed rotational adjustment of the accessory housing 202 relative to the collar 232. The threaded stem 250 may alternatively or additionally be replaced with a spring biased pin, ball, or detent that engages recesses in the accessory housing 202 to provide a quick-release indexed rotational adjustment of the angular position of the accessory housing 202 relative to the collar 232. Other embodiments that enable indexed rotational adjustment of the accessory housing 202 relative to the collar 232 can be found, for example, in FIGS. 9A-16 and 35 of the aforementioned U.S. patent application Ser. No. 14/186,088, filed Feb. 21, 2014, which is incorporated by reference in its entirety.

Referring to FIGS. 15A and 15C, the arm assembly 234 includes a first arm portion 236 pivotably attached to the second ear 244 of the collar 242 by a pin or screw and nut 237, and a second arm portion 238 slidably coupled to the first arm portion 236 by a locking knob with a threaded stem 239. The pin or screw and nut 237 enables the first arm portion 236, and thus the entire arm assembly 234, to pivot between an operable position (FIG. 15A) where the accessory 200 can be coupled to the power tool housing 12, and a storage position (FIG. 15C), where the arm assembly 234 folds over the accessory housing 202 for compact storage. As shown in FIGS. 15A and 15B, the second arm portion 238 includes a longitudinal slot 235 that receives the threaded stem of the locking knob with threaded stem 239. The threaded stem of the locking knob with threaded stem 239 is also received in a threaded opening in the first arm portion 236. This allows the second arm portion 238 to be longitudinally adjustable relative to the first arm portion 236 along the length of the slot 235, to vary the effective length of the arm assembly 234 in order to accommodate power tools of different sizes and configurations. In other embodiments, the longitudinal slot may be configured with bulging recesses and a spring biased indexing pin to allow for indexed movement of the second arm portion 238 relative to the first arm portion 236. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

Referring to FIGS. 14-15B, the clamping assembly 240 includes a generally U-shaped bracket 270 that is fixedly coupled to the second arm portion 238. The bracket 270 includes a cross-bar 272 and a pair of legs 274, 276 at opposite ends of the cross-bar 272. A flexible strap 280 is fixedly connected to one leg 274 and is received in a buckle 282 coupled to the other leg 276. A free end 284 of the strap and the remainder of the strap 280 each may include a hook and loop fastener material (e.g., material sold under the trademark Velcro® by Velcro Industries B.V.) to enable the free end 284 to be retained on the remainder of the strap 280. The effective length of the strap 280 can be adjusted using the buckle 282 and the free end 284, as will be apparent to one of ordinary skill in the art. In addition, this configuration enables the accessory housing 202 to be rigidly coupled to the tool housing 12 using an arm assembly 234 having only a single arm.

In use, first, the first arm portion 236 is folded from its storage position (FIG. 15C) to its operation position (FIG. 15A). Second, the locking knob with threaded stem 239 is loosened, and the second arm portion 238 is moved along its axis from its most forward position (FIG. 15A) to its most rearward position (FIG. 15B), for a maximum effective length of the arm assembly. Third, the strap 280 is loosened. Fourth, the legs 274, 276 are placed on either side of the motor and transmission housing 13 and the strap 280 is tightened over the motor and transmission housing 13 by pulling on the free end 284 of the strap 280. Fifth, the first arm portion 236 is moved rearward relative to the second arm portion 238 until the input shaft 204 is received in the end effector 22 of the power tool 10. Finally, the locking knob with threaded stem 239 is tightened to secure the collar 232 to the power tool housing 12. While the brace rigidly attaches the accessory housing 202 to the power tool housing 12, the accessory housing 202 may be rotated relative to the collar 232 by loosening the knob 252 and threaded stem 250, rotating the accessory housing 202 to a desired position, and tightening the knob 252 and threaded stem 250.

Referring to FIGS. 16-18B, a third embodiment of a power tool accessory 300 is removably coupled to the power tool housing 12 of the power tool 10. The power tool accessory 300 includes an accessory housing 302, an input shaft 304, a transmission (inside the accessory housing 302, not shown) and a working tool 306, similar to the accessory housing 102, the input shaft 104, the mechanical transmission 120, and the working tool 106 of the first embodiment. The power tool accessory 300 also includes a brace 330 configured to adjustably and rigidly couple the accessory housing 302 to the power tool housing 12. The brace 330 includes a collar 332 coupled to the accessory housing 302, a clamping assembly 340 configured to be removably attached to the motor and transmission housing 13 of the power tool housing 12, and an arm assembly 334 coupled at one end to the collar 332 and at an opposite end to the clamping assembly 340. The brace 330 differs from the braces 130 and 230 of the first and second embodiments, as described in greater detail below.

The collar 332 is similar in structure to the collar 132 of the first embodiment but differs in certain respects. The collar 332 includes a first concave ear 342 and a second concave ear 344 that are pivotally connected to one another at one end by a pin 346 and that are connectable to each other at a second end by a set screw 348. The second concave ear 344 can be pivoted between an open position (FIG. 17A) to facilitate coupling the collar 332 to the accessory housing 302, and a closed position (FIG. 17B), where the set screw connects the two ears 342, 344 so that the collar 332 loosely surrounds the accessory housing 302 so that the accessory housing 302 still may rotate relative to the collar 332. Coupled to the second concave ear 344 is a threaded stem 350 and a knob 352 that can be rotated between a locked position and an unlocked position. In the locked position, the threaded stem 350 tightly engages the accessory housing 302 to prevent rotation of the accessory housing 302 relative to the collar 332. In the unlocked position, the threaded stem 350 does not tightly engage the accessory housing 302 to allow rotation of the accessory housing 302 relative to the collar 332. This enables the accessory housing 302 to be locked in a plurality of different rotational positions relative to the power tool 10 while the brace 330 rigidly attaches the accessory 300 to the power tool housing 12. Thus, the accessory 300 can be used to make cuts in a plurality of different directions without changing the orientation of the power tool 10.

In other embodiments, the rear end of the accessory housing 302 may include a plurality of recesses that receive the threaded stem 350 to provide indexed rotational adjustment of the accessory housing 302 relative to the collar 332. The threaded stem 350 may alternatively or additionally be replaced with a spring biased pin, ball, or detent that engages recesses in the accessory housing 302 to provide a quick-release indexed rotational adjustment of the angular position of the accessory housing 302 relative to the collar 332. Other embodiments that enable indexed rotational adjustment of the accessory housing 302 relative to the collar 332 can be found, for example, in FIGS. 9A-16 and 35 of the aforementioned U.S. patent application Ser. No. 14/186,088, filed Feb. 21, 2014, which is incorporated by reference in its entirety.

The arm assembly 334 includes a first arm portion 336 pivotably attached to the first ear 342 of the collar 332 by a pin or a nut, bolt, and screw, and a second arm portion 338 slidably coupled to the first arm portion 336 by a first thumb screw and bolt 339. The pin enables the first arm portion 336, and thus the entire arm assembly 334, to pivot between a clamping position (FIGS. 17A-17B) where the accessory 300 can be fixedly clamped to the power tool housing 12 and side handle position (FIG. 18A) where the arm assembly 334 can be used as a side handle by an operator. The interface between the first ear 342 and the first arm portion 336 may include a one or more ribs to help retain the first arm portion 336 in one of the clamping position and the side handle position. In another embodiment, the arm assembly may be further pivoted to a storage position (FIG. 18B), where the arm assembly 334 folds over the accessory housing 302 for compact storage.

The first arm portion 336 includes a first longitudinal slot 335 that receives the first thumb screw 339, which is also received in a threaded opening in the second arm portion 338. This allows the second arm portion 338 to be longitudinally adjustable relative to the first arm portion 336 along the length of the slot 335, to vary the effective length of the arm assembly 334 in order to accommodate power tools of different sizes and configurations. In other embodiments, the longitudinal slot may be configured with bulging recesses and a spring biased indexing pin to allow for indexed movement of the second arm portion 338 relative to the first arm portion 336. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

The clamping assembly 340 includes a generally cup-shaped bracket 370 that is configured to be received over a rear end of the motor and transmission housing 13. The second arm portion 338 includes a longitudinal slot 374 that receives a second thumb screw 372 that connects the second arm portion 338 to the bracket 370. The thumb screw 372 can be loosened to adjust a longitudinal position of the bracket 370 relative to the second arm portion 338 and can be tightened to fixedly connect the bracket 370 to the second arm portion 338. This configuration enables the accessory housing 302 to be rigidly coupled to the tool housing 12 using an arm assembly 334 having only a single arm. In alternative embodiments, the single arm may be configured to be received on either the left or right side of the tool housing 12 to facilitate left and right handed use of the power tool 10.

Figure 17A:
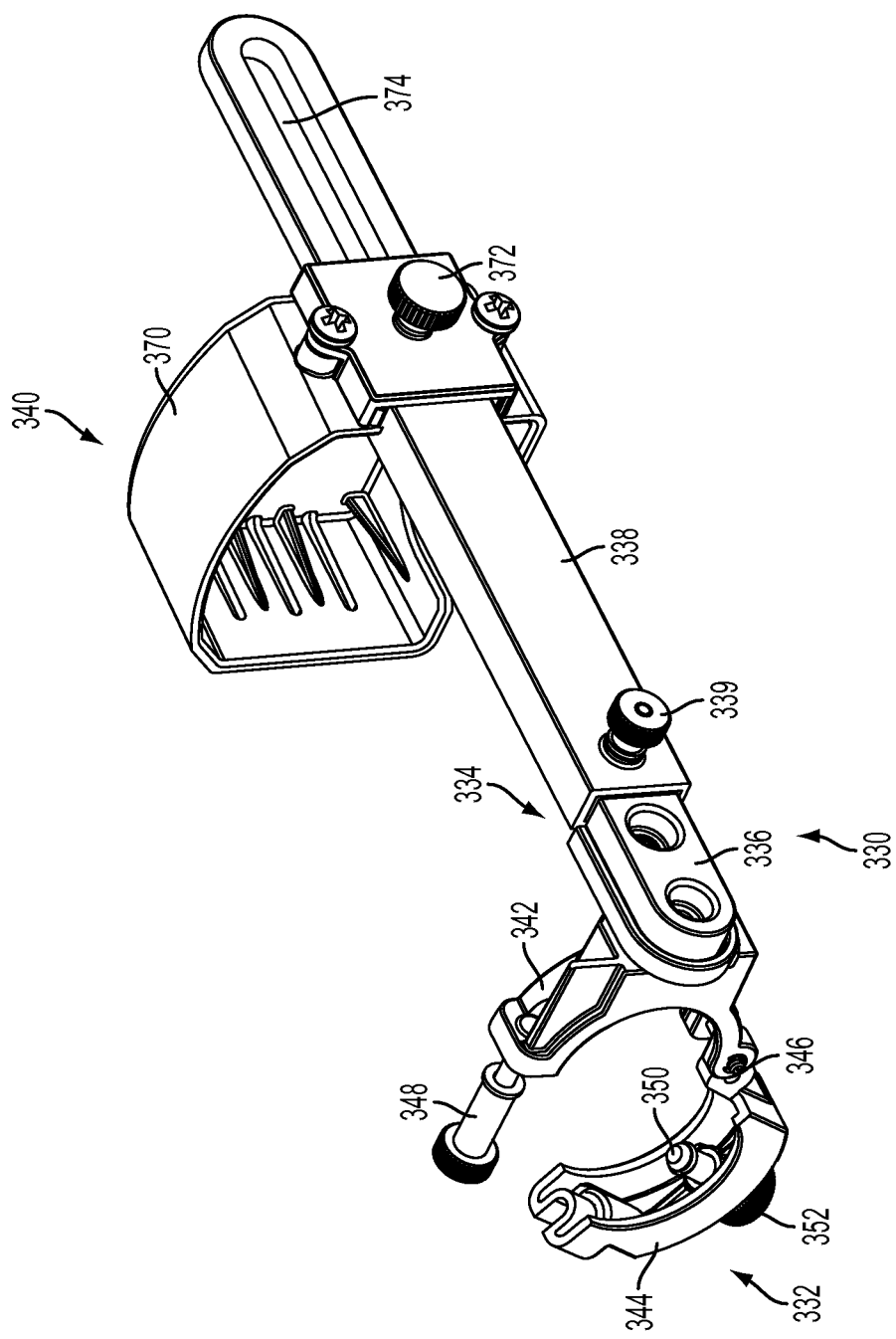
FIGS. 17A and 17B are perspective views of the brace of the power tool accessory of FIG. 16 with the collar, the arm assembly, and the clamp assembly in different positions.
Figure 17B:
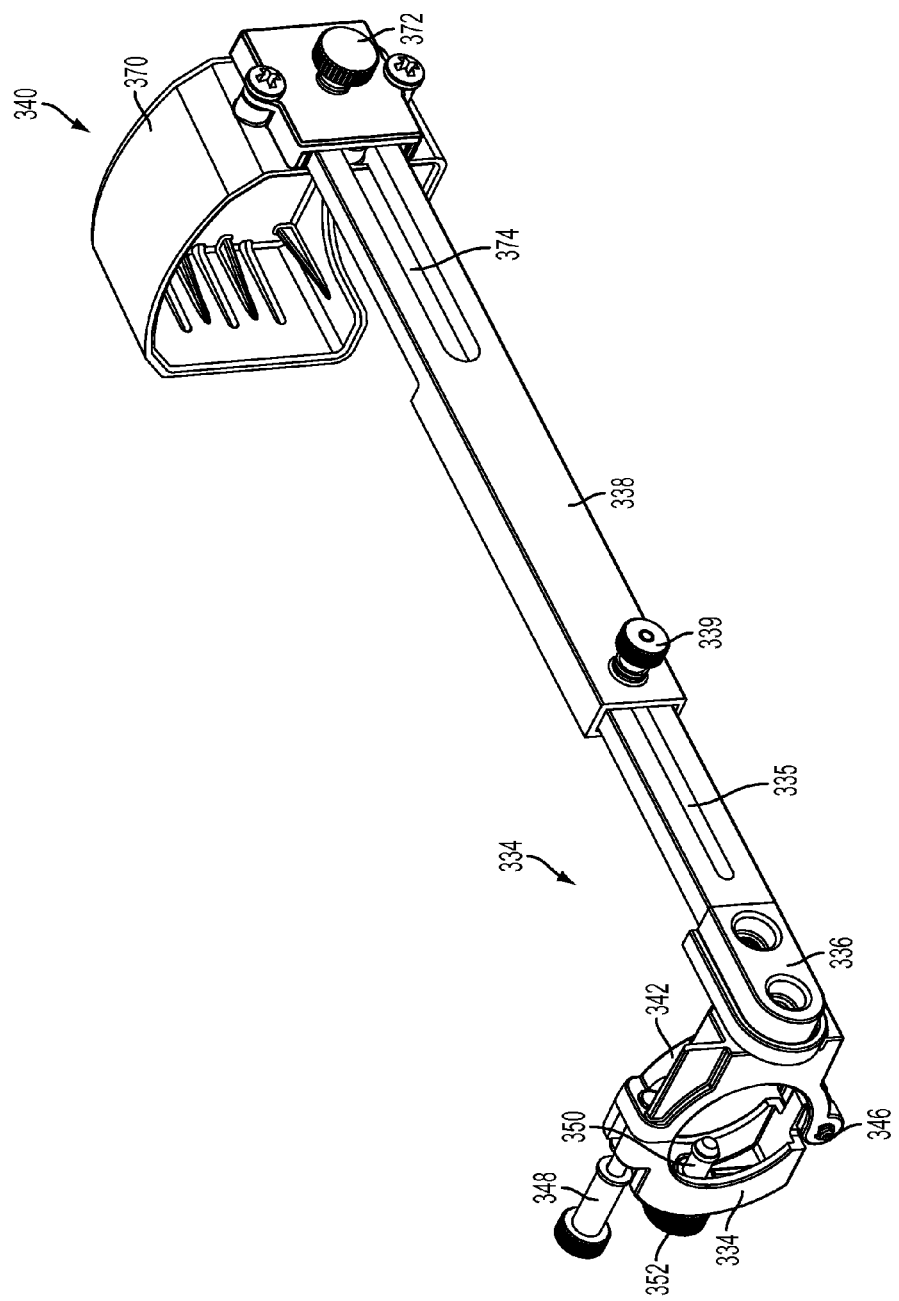
Figure 18A:
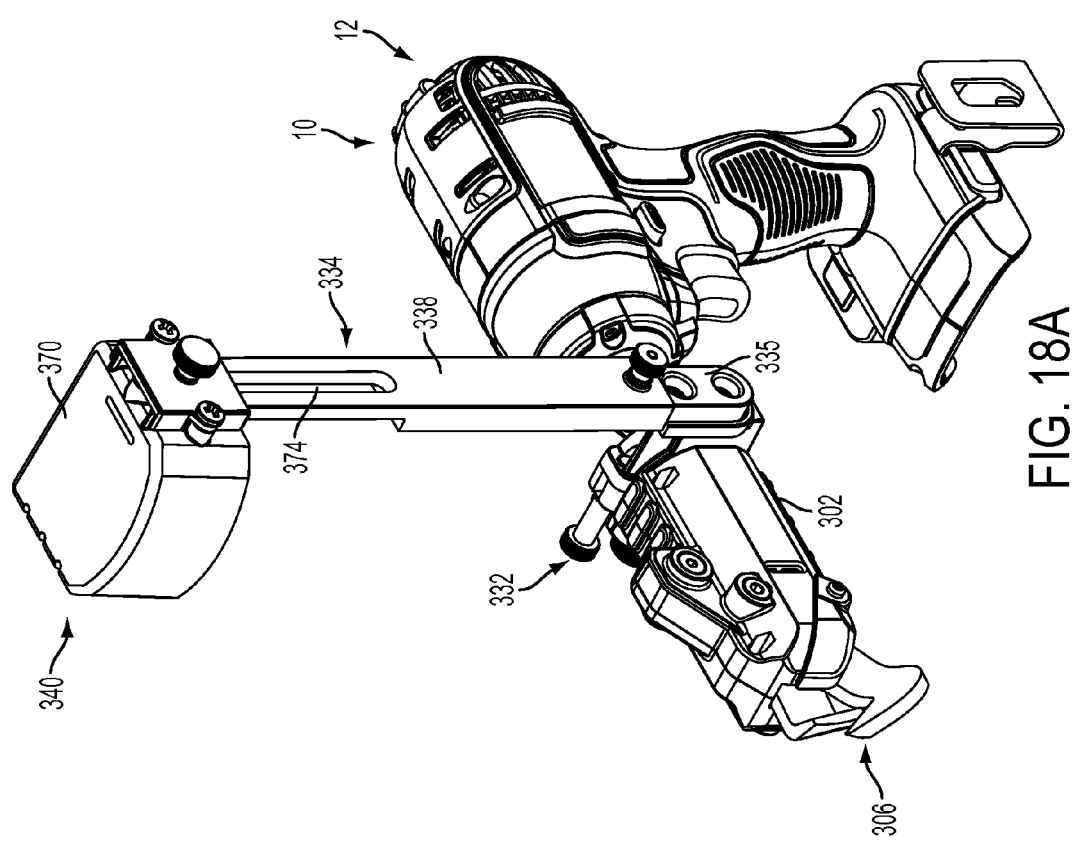
FIGS. 18A and 18B are perspective views of the power tool accessory and power tool of FIG. 16 with the arm assembly in different positions.
Figure 18B:
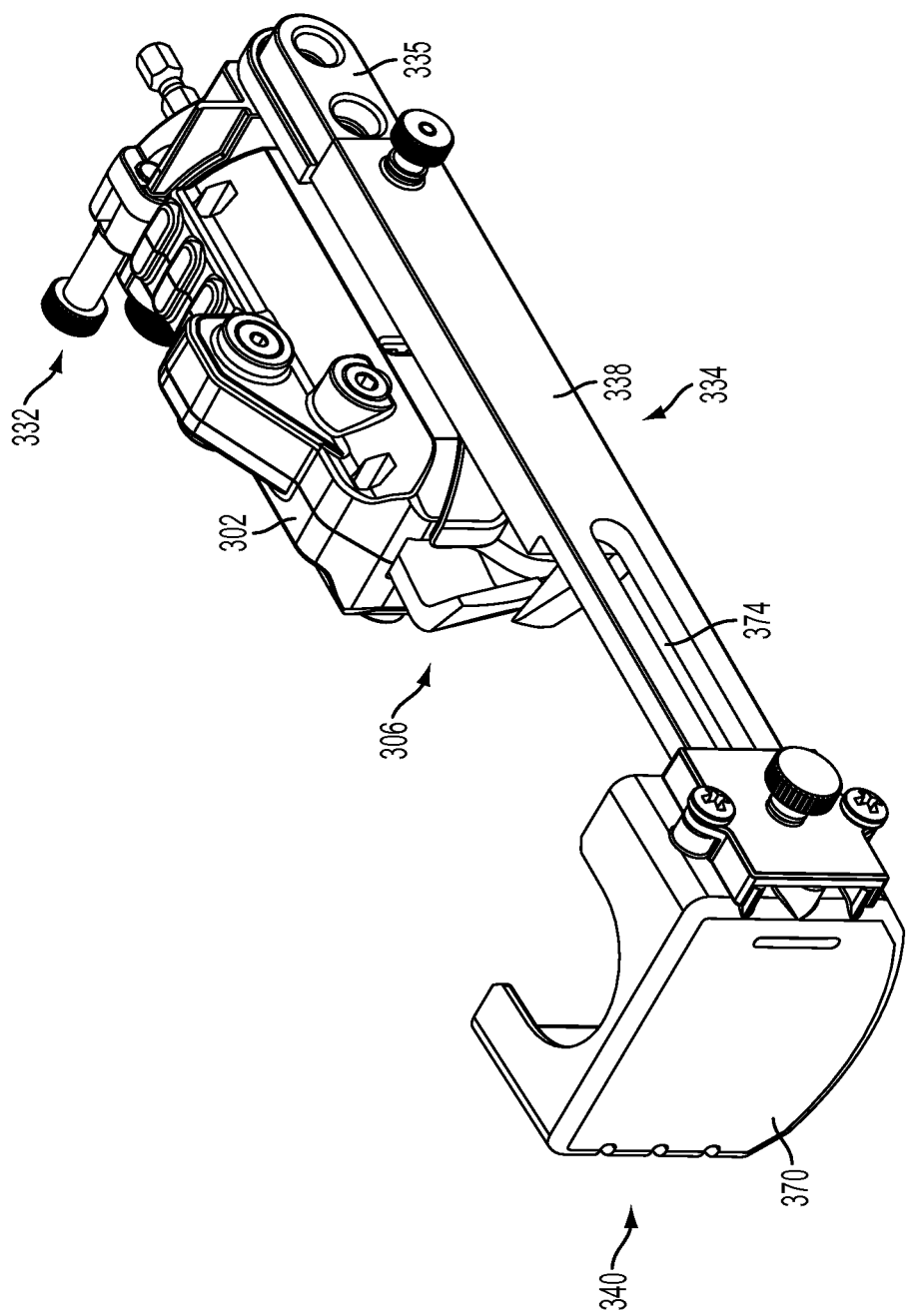

In use, first, the first arm portion 336 may be pivoted to its operation position (FIG. 17A). Second, the first thumb screw 339 is loosened, and the second arm portion 338 is moved along its axis from its most forward position (FIG. 17A) to a desired position relative to the first arm portion 336 (e.g., as shown in FIG. 17B) at which point the first thumb screw 339 is tightened. Third, the second thumb screw 372 is loosened and the bracket 370 is moved from its most forward position (FIG. 17A) to its most rearward position (FIG. 17B). Fourth, the ears of the collar 332 are placed around the accessory housing 302 and connected to each other using the set screw 348. Fifth, the input shaft 304 is received in the end effector 22 of the power tool 10. Finally, the bracket 370 is moved axially forward and snugly received over the rear end of the motor and transmission housing 13 (FIG. 16) at which point the second thumb screw 372 is tightened. If necessary, one or both of the thumb screws 339, 372 may be loosened and tightened to further adjust the effective length of the brace 330 in order to tightly couple the accessory housing 302 to the power tool housing 12. While the brace 330 rigidly couples the accessory housing 302 to the power tool housing 12, the accessory housing 302 may be rotated relative to the collar 332 by loosening the knob 352 and threaded stem 350, rotating the accessory housing 302 to a desired rotational position, and tightening the knob 352 and threaded stem 350.

Referring to FIGS. 19A-20C, a fourth embodiment of a power tool accessory 400 is removably coupled to the power tool housing 12 of the power tool 10. The power tool accessory 400 includes an accessory housing 402, an input shaft 404, a mechanical transmission (inside the accessory housing 402, not shown) and a working tool 406, similar to the accessory housing 102, the input shaft 104, the mechanical transmission 120, and the working tool 106 of the first embodiment. The power tool accessory 400 also includes a brace 430 configured to adjustably and rigidly couple the accessory housing 402 to the power tool housing 12. The brace 430 includes a collar 432 coupled to the accessory housing 402, a clamping assembly 440 configured to be removably attached to the motor and transmission housing 13 of the power tool housing 12, and an arm assembly 434 coupled at one end to the collar 432 and at an opposite end to the clamping assembly 440. The brace 430 differs from the braces 130, 230, 330 of the first, second and third embodiments, as described in greater detail below.

The collar 432 is identical in structure to the collar 132 of the first embodiment. In particular, the collar 432 includes a first concave ear 442 and a second concave ear 444 that are on left and right sides of the accessory housing 402 and that are connected to one another by nuts and screws. The collar 432 loosely surrounds the accessory housing 402 so that the accessory housing 402 still may rotate relative to the collar 432. A threaded stem 450 and a knob 452 are rotatably coupled to the second concave ear 444 and can be rotated between a locked position and an unlocked position. In the locked position, the threaded stem 450 tightly engages the accessory housing 402 to prevent rotation of the accessory housing 402 relative to the collar 432. In the unlocked position, the threaded stem 450 does not tightly engage the accessory housing 402 to allow rotation of the accessory housing 402 relative to the collar 432. This enables the accessory housing 402 to be locked in a plurality of different rotational positions relative to the power tool 10 while the brace 430 rigidly attaches the accessory 400 to the power tool housing 12. Thus, the accessory 400 can be used to make cuts in a plurality of different directions without changing the orientation of the power tool 10.

In other embodiments, the rear end of the accessory housing 402 may include a plurality of recesses that receive the threaded stem 450 to provide indexed rotational adjustment of the accessory housing 402 relative to the collar 432. The threaded stem 450 may alternatively or additionally be replaced with a spring biased pin, ball, or decent that engages recesses in the accessory housing 402 to provide a quick-release indexed rotational adjustment of the angular position of the accessory housing 402 relative to the collar 432. Other embodiments that enable indexed rotational adjustment of the accessory housing 402 relative to the collar 432 can be found, for example, in FIGS. 9A-16 and 35 of the aforementioned U.S. patent application Ser. No. 14/186,088, filed Feb. 21, 2014, which is incorporated by reference in its entirety.

The arm assembly 434 includes a first arm portion 436 pivotably attached to the first ear 442 of the collar 432 by a pin, and a second arm portion 438 slidably coupled to the first arm portion 436 by a locking knob 439 with a threaded stem. The first arm portion 436, and thus the entire arm assembly 434, is able to pivot among a clamping position (FIG. 20A) where the accessory 400 can be fixedly clamped to the power tool housing 12, an intermediate position (FIG. 20B) where the arm assembly 434 can be used as a side handle by an operator, and a storage position (FIG. 20C), where the arm assembly 434 folds over the accessory housing 402 for compact storage.

The second arm portion 438 includes a longitudinal slot 435 that receives the stem of the locking knob 439, which is also received in a threaded opening in the first arm portion 436. This allows the second arm portion 438 to be longitudinally adjustable relative to the first arm portion 436 along the length of the slot 435, to vary the effective length of the arm assembly 434 in order to accommodate power tools of different sizes and configurations. In other embodiments, the longitudinal slot may be configured with bulging recesses and a spring biased indexing pin to allow for indexed movement of the second arm portion 438 relative to the first arm portion 436. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

The clamping assembly 440 includes a side bracket 472 extending rearward from the second arm portion 438, and a generally hook-shaped bracket 470 extending from the side bracket 472. The side bracket 472 is configured to abut one side of the motor and transmission housing 13, while the hook-shaped bracket 470 is configured to be received over a rear end of the motor and transmission housing 13. This configuration enables the accessory housing 402 to be rigidly coupled to the tool housing 12 using an arm assembly 434 having only a single arm. In other embodiments, the brace may be configured so that the single arm can be placed on either the left or right side of the tool housing 12 to facilitate left and right handed use of the power tool 10.

Figure 19A:
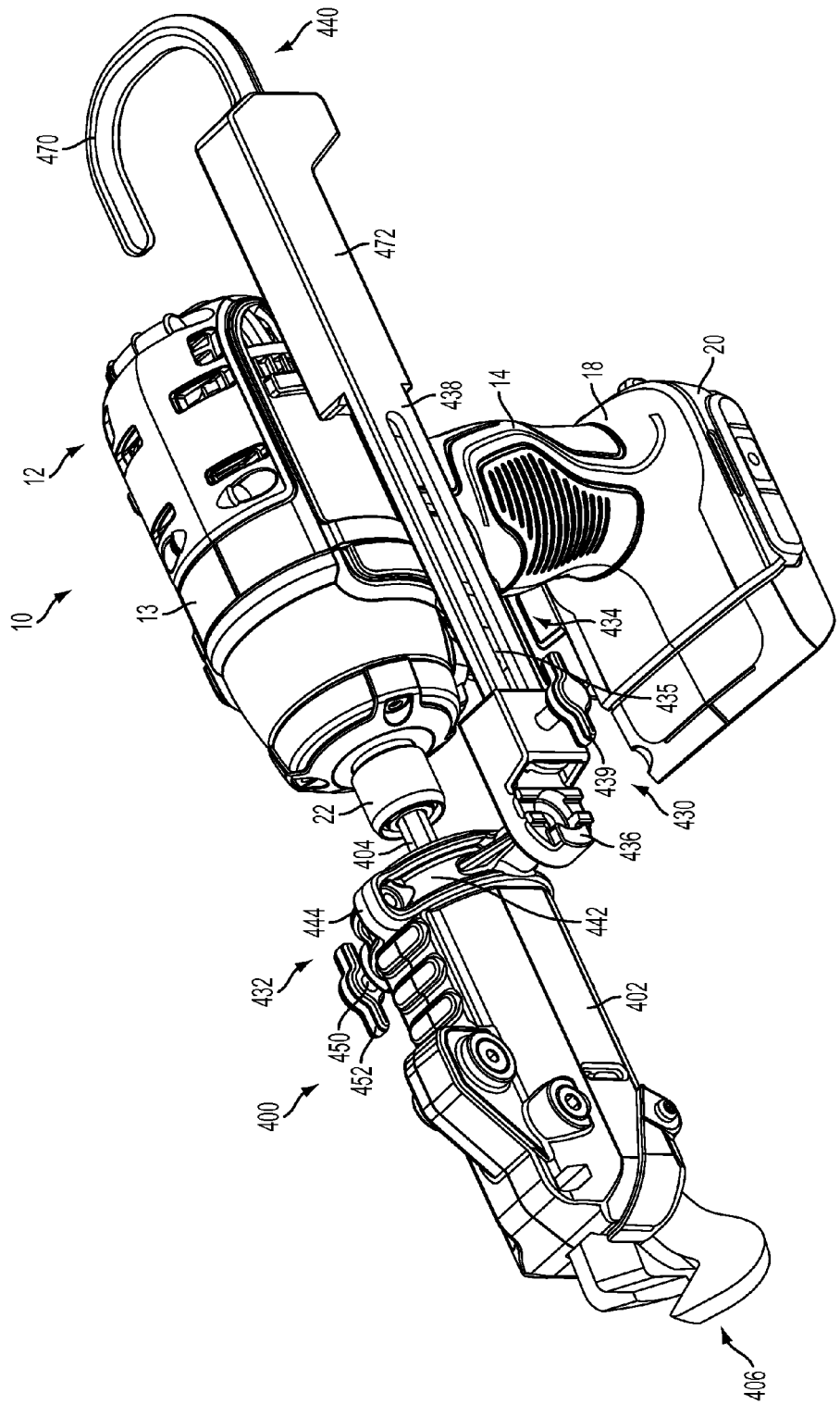
FIGS. 19A and 19B are perspective view of a fourth embodiment of a power tool accessory and a power tool, with the brace in different positions.
Figure 19B:
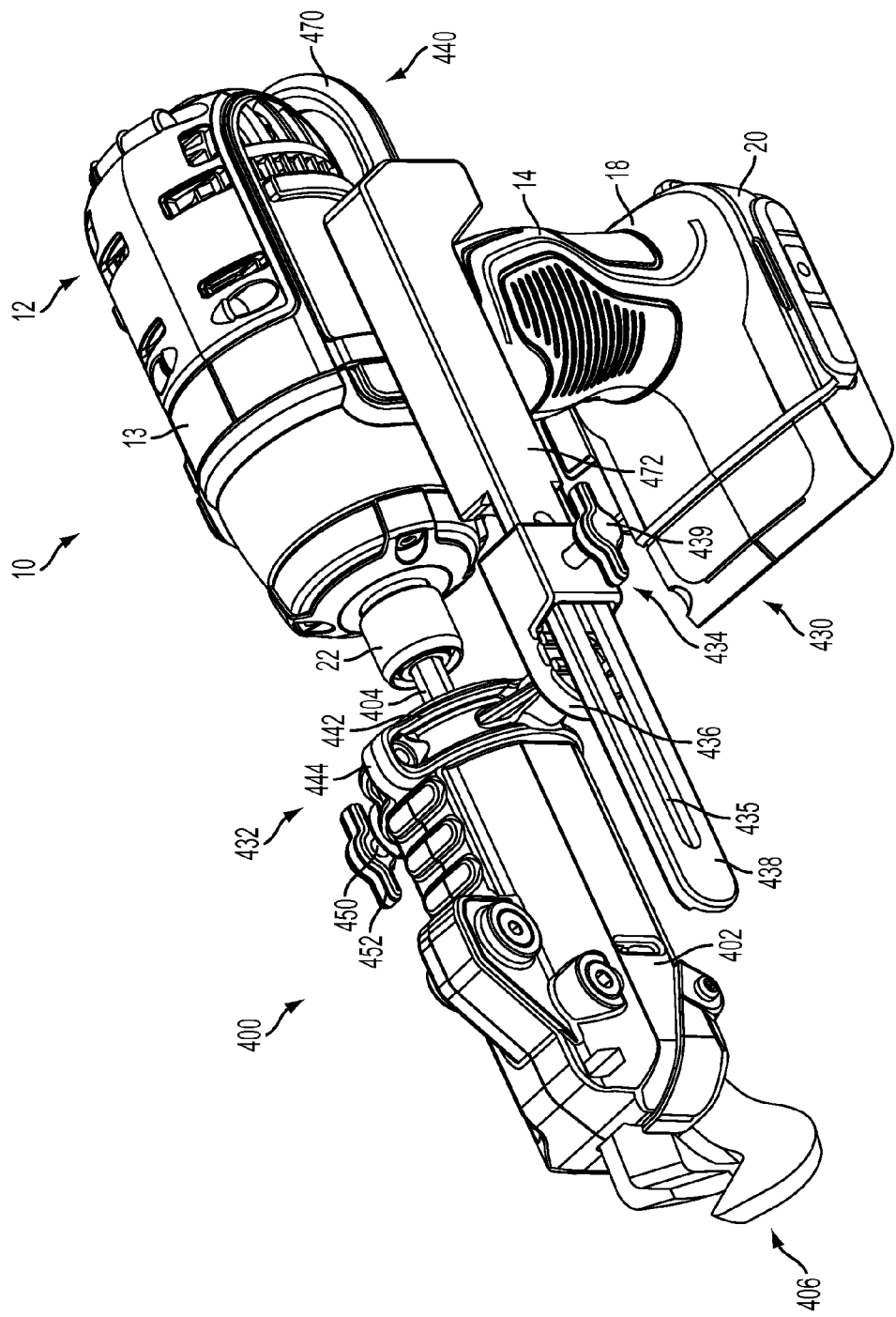
Figure 20A:
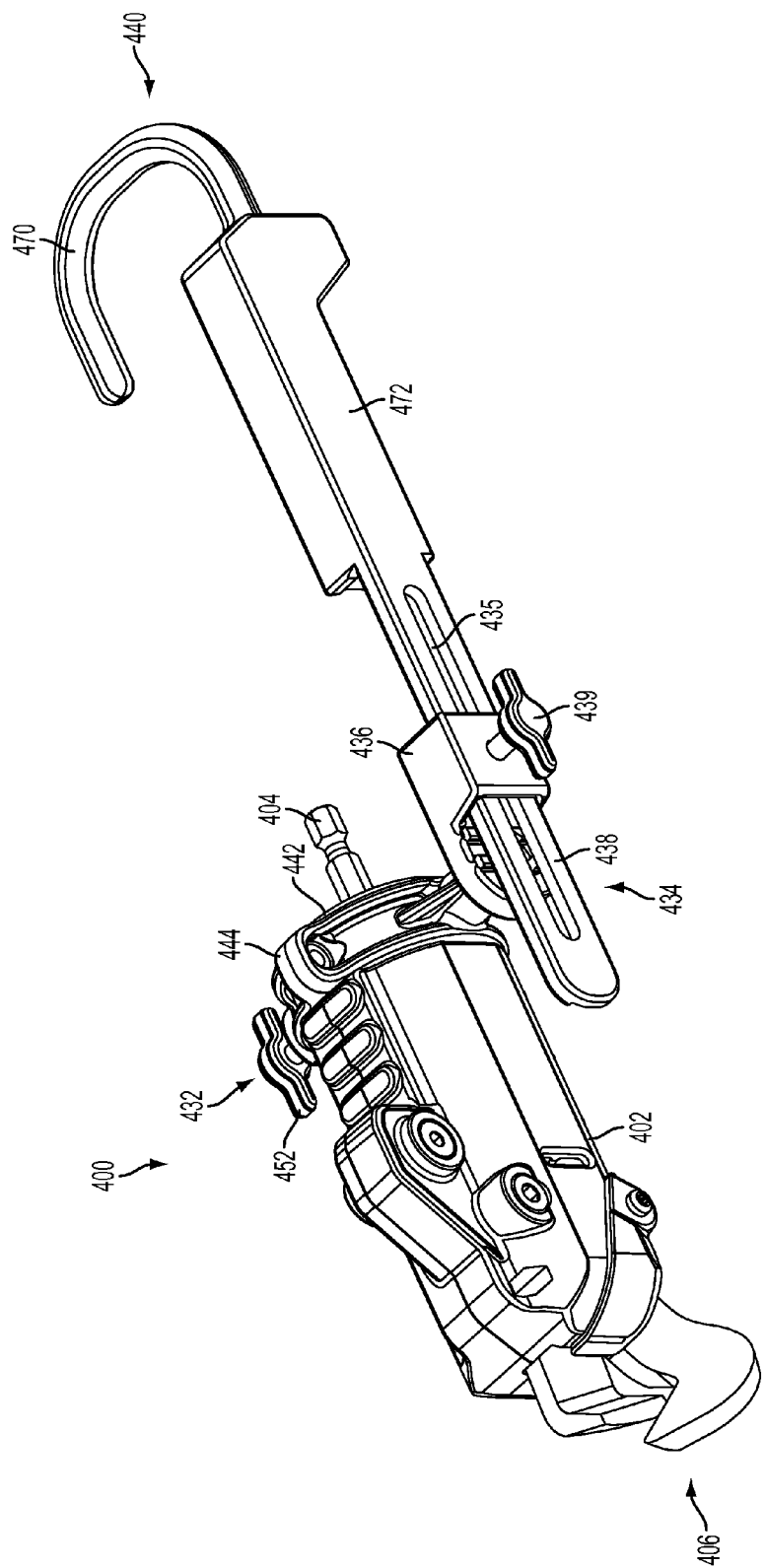
Figure 20C:
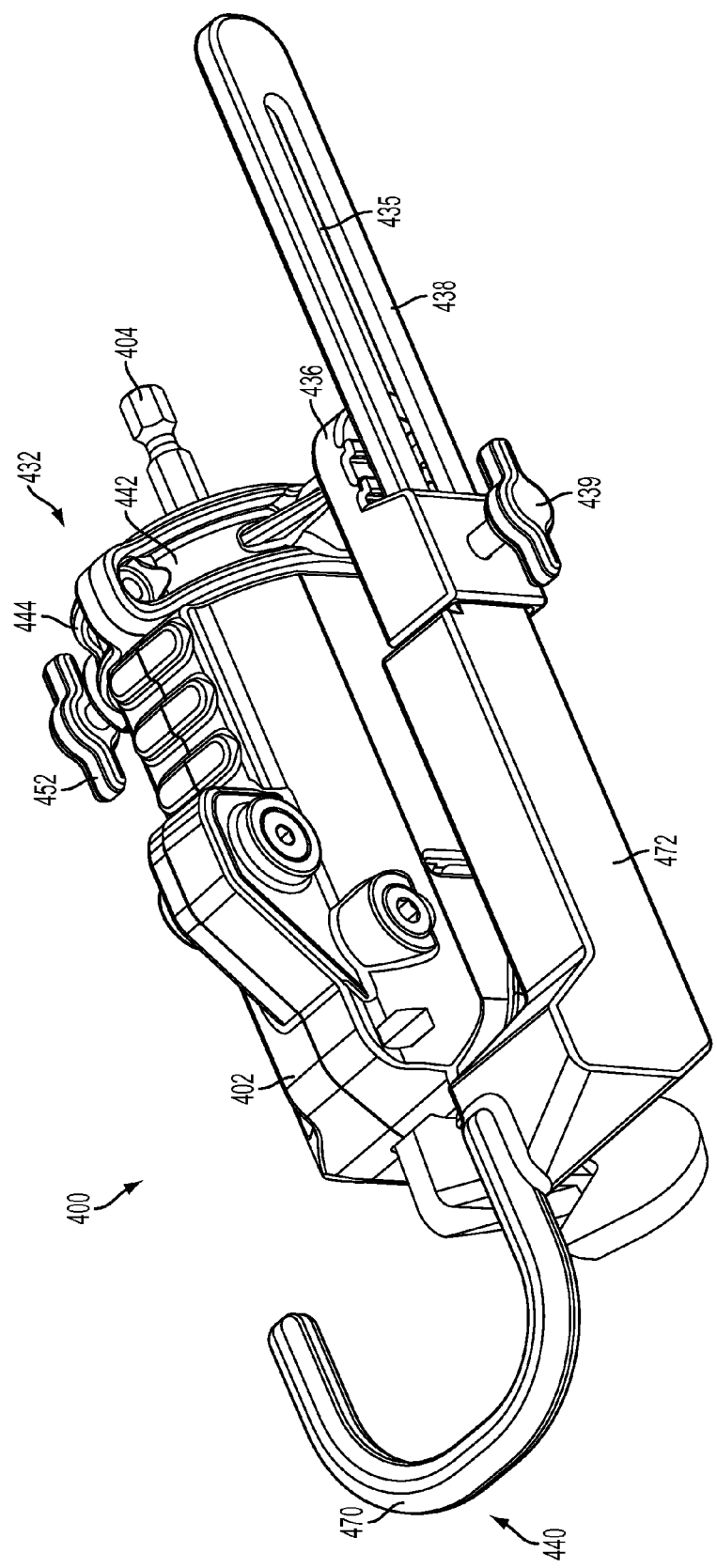

In use, first, the first arm portion 436 is unfolded from its storage position (FIG. 20C) to its operation position (FIG. 20A). Second, the locking knob 439 is loosened, and the second arm portion 438 is moved along its axis from its most forward position (FIG. 19B) to its most rearward position (FIG. 19A). Third, the input shaft 404 is received in the end effector 22 of the power tool 10. Finally, hook-shaped bracket 470 is moved axially forward and snugly received over the rear end of the motor and transmission housing 13 (FIG. 19B) at which point the locking knob 439 is tightened. While the brace 430 rigidly couples the accessory housing 402 to the power tool housing 12, the accessory housing 402 may be rotated relative to the collar 432 by loosening the knob 452 and threaded stem 450, rotating the accessory housing 402 to a desired rotational position, and tightening the knob 452 and threaded stem 450.

Figure 21:
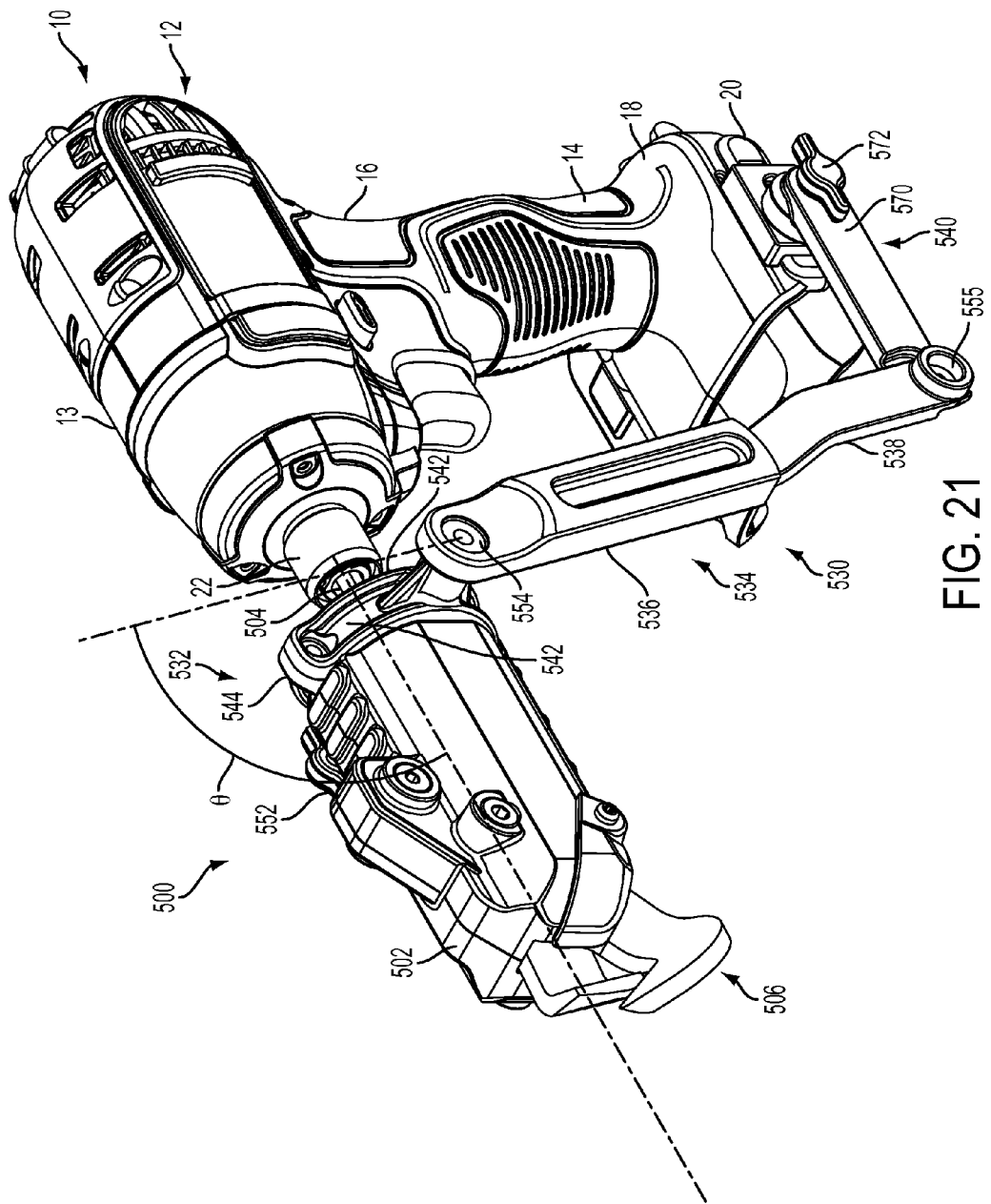
FIG. 21 is a perspective view of a fifth embodiment of a power tool accessory and a power tool.
Figure 22A:
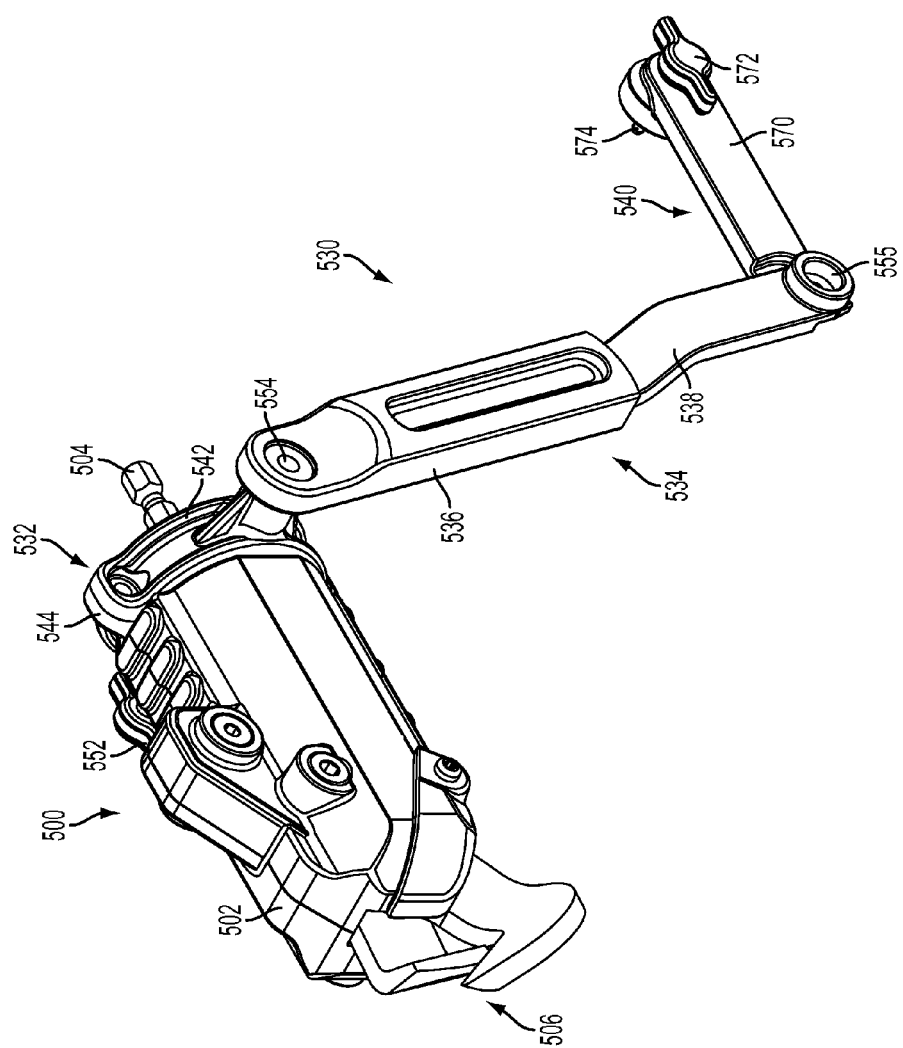
FIGS. 22A and 22B are perspective views of the power tool accessory of FIG. 21 with the arm assembly in different positions.
Figure 22B:
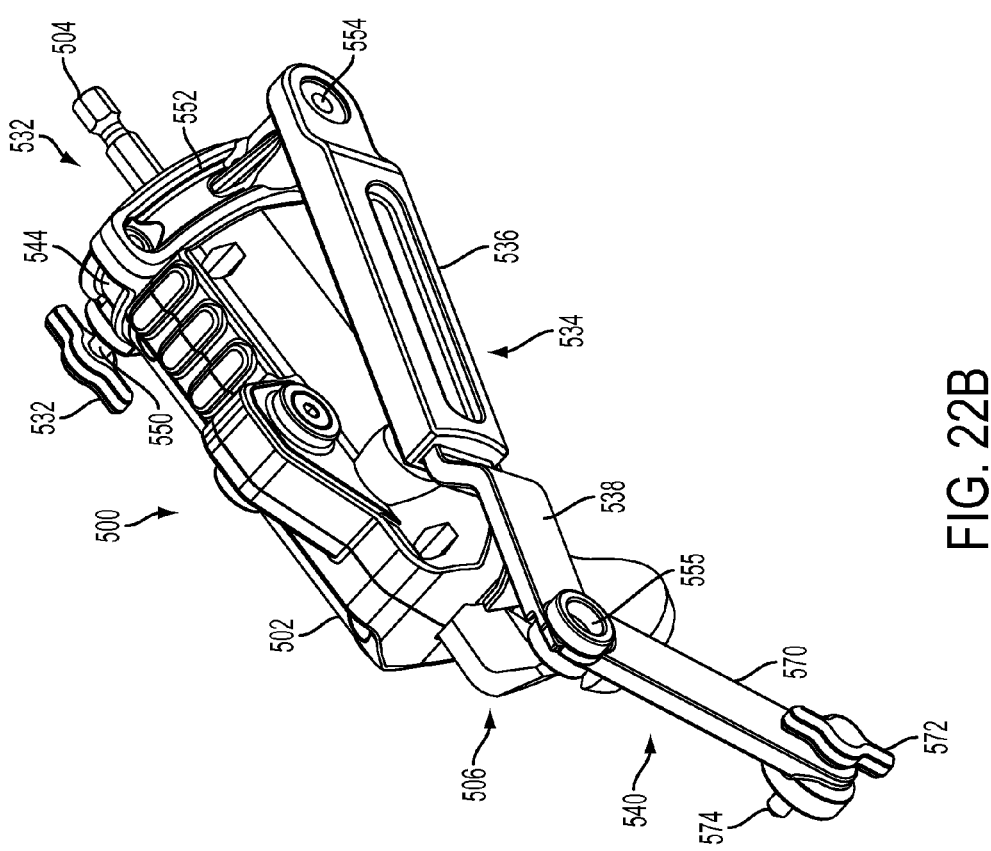
Figure 24:
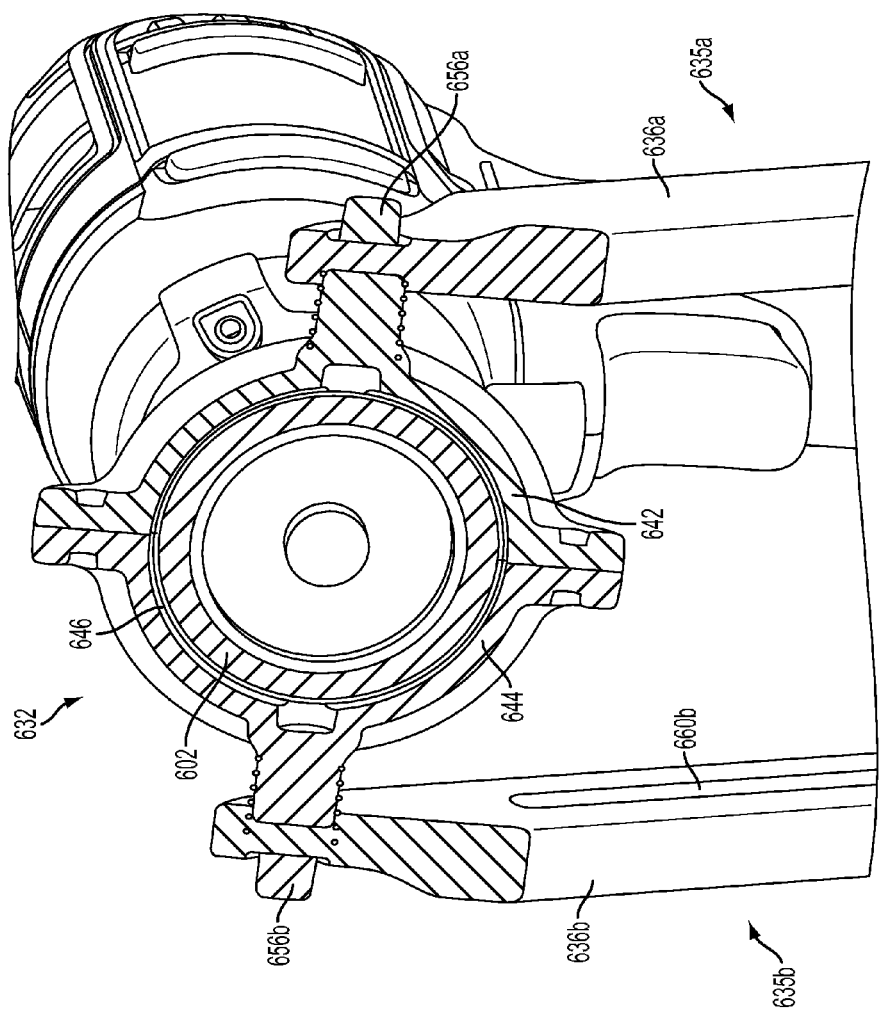
FIG. 24 is a perspective view of the power tool accessory and power tool of FIG. 23, with the collar, the arm assembly, and accessory housing partially in cross-section.

Referring to FIGS. 21-22B, a fifth embodiment of a power tool accessory 500 is removably coupled to the power tool housing 12 of the power tool 10. The power tool accessory 500 includes an accessory housing 502, an input shaft 504, a mechanical transmission (inside the accessory housing 502, not shown) and a working tool 506, similar to the accessory housing 102, the input shaft 104, the mechanical transmission 120, and the working tool 106 of the first embodiment. The power tool accessory 500 also includes a brace 530 configured to adjustably and rigidly couple the accessory housing 502 to the power tool housing 12. The brace 530 includes a collar 532 coupled to the accessory housing 502, a clamping assembly 540 configured to be removably attached to the base 18 of the handle 14 of the power tool 10, and an arm assembly 534 pivotably attached at one end to the collar 532 and at an opposite end to the clamping assembly 540. The brace 530 differs from the braces 130, 230, 330, and 430 of the first, second, third, and fourth embodiments, as described in greater detail below.

The collar 532 is identical in structure to the collar 132 of the first embodiment. In particular, the collar 532 includes a first concave ear 542 and a second concave ear 544 on left and right sides of the accessory housing 502 and connected to one another by nuts and screws. The collar 532 loosely surrounds the accessory housing 502 so that the accessory housing 502 still may rotate relative to the collar 532. A threaded stem 550 and a knob 552 are rotatably coupled to the second concave ear 544 and can be rotated between a locked position and an unlocked position. In the locked position, the threaded stem 550 tightly engages the accessory housing 502 to prevent rotation of the accessory housing 502 relative to the collar 532. In the unlocked position, the threaded stem 550 does not tightly engage the accessory housing 502 to allow rotation of the accessory housing 502 relative to the collar 532. This enables the accessory housing 502 to be locked in a plurality of different rotational positions relative to the power tool 10 while the brace 530 rigidly attaches the accessory 500 to the power tool housing 12. Thus, the accessory 500 can be used to make cuts in a plurality of different directions without changing the orientation of the power tool 10.

In other embodiments, the rear end of the accessory housing 502 may include a plurality of recesses that receive the threaded stem 550 to provide indexed rotational adjustment of the accessory housing 502 relative to the collar 532. The threaded stem 550 may alternatively or additionally be replaced with a spring biased pin, ball, or detent that engages recesses in the accessory housing 502 to provide a quick-release indexed rotational adjustment of the angular position of the accessory housing 502 relative to the collar 532. Other embodiments that enable indexed rotational adjustment of the accessory housing 502 relative to the collar 532 can be found, for example, in FIGS. 9A-16 and 35 of the aforementioned U.S. patent application Ser. No. 14/186,088, filed Feb. 21, 2014, which is incorporated by reference in its entirety.

The arm assembly 534 includes a first arm portion 536 and a second arm portion 538. The first arm portion 536 is pivotably attached to the collar 532 by a first pivot pin 554 that is received through an aperture in the first ear 542. The pivotal connection between the first arm portion 536 and the collar 532 enables the arm assembly 534 to be pivoted relative to the accessory housing 502 to clamp different portions of the power tool 10, and allows the arm assembly 534 to be folded along the length of the accessory housing 502 for storage (FIG. 22B). The second arm portion 538 is telescopically received in a longitudinal opening in the first arm portion 536 with a positioning pin that slides in a longitudinal slot in the first arm portion 536, similar to the telescopic connection between the first and second arm portions 136, 138 of the first embodiment. Like the first embodiment, this telescopic connection allows the length of the arm assembly 534 to be adjustable by a user. In other embodiments, the longitudinal slot may be configured with bulging recesses and the positioning pin may be spring biased to allow for indexed movement of the second arm portion 538 relative to the first arm portion 536. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

The clamping assembly 540 includes a bracket 570 that is coupled at one end to the second arm portion 538 by a second pivot pin 555. At the other end, the bracket 570 includes a knob 572 with a threaded stem 574. The threaded stem can be received in a threaded aperture at the base 18 of the handle 14, adjacent the battery receptacle 20, to secure the clamp 570 to the power tool housing 12.

The arm assembly 534 and clamping assembly 540 are configured so that the clamping assembly 540 tightly engages the base 18 of the handle 14 adjacent to the battery receptacle 20. When attached to the tool housing 12, the arm assembly 534 and the clamping assembly 540 fix the accessory housing 502 to the tool housing 12 with a longitudinal axis L of the arm assembly 534 at an angle θ to the output axis X of the power tool 10, where the angle θ may be approximately 40 degrees to approximately 75 degrees. This configuration allows the cutting tool 506 to cut into a workpiece without the arm assembly 534 interfering with the cutting direction. This configuration also enables the accessory housing 502 to be rigidly coupled to the tool housing 12 using an arm assembly 534 having only a single arm. In other embodiments, the brace may be configured so that the single arm can be placed on either the left or right side of the tool housing 12 to facilitate left and right handed use of the power tool 10.

In use, first, the first arm portion 536 is unfolded from its storage position (FIG. 22B) to its operation position (FIG. 22A). Second, the first arm portion 536 is pivoted relative to the collar 532, the second arm portion 538 is longitudinally adjusted relative to the first arm portion 536, and the bracket 570 is pivoted relative to the second arm portion 538 so that the threaded stem 574 is aligned with the threaded aperture at the base 18 of the handle 14. Finally, the knob 572 is rotated to tightly secure the bracket 570 to the power tool housing 12 in a locked position. This securely attaches the accessory housing 502 to the power tool housing 12. While the brace 530 rigidly couples the accessory housing 502 to the power tool housing 12, the accessory housing 502 may be rotated relative to the collar 532 by loosening the knob 552 and threaded stein 550, rotating the accessory housing 502 to a desired rotational position, and tightening the knob 552 and threaded stem 550.

Referring to FIGS. 23-26B, a sixth embodiment of a power tool accessory 600 is removably coupled to the power tool housing 12 of the power tool 10. The power tool accessory 600 includes an accessory housing 602, an input shaft 604, a mechanical transmission (inside the accessory housing 602, not shown) and a working tool 606, similar to the accessory housing 102, the input shaft 104, the mechanical transmission 120, and the working tool 106 of the first embodiment. The power tool accessory 600 also includes a brace 630 configured to adjustably and rigidly couple the accessory housing 602 to the power tool housing 12. The brace 630 includes a collar 632 coupled to the accessory housing 602, a clamping assembly 640 configured to be removably attached to the base 18 of the handle 14 of the power tool 10, and an arm assembly 634 pivotably attached at one end to the collar 632 and at an opposite end to the clamping assembly 640. The brace 630 differs from the braces 130, 230, 330, 430, and 530 of the first, second, third, fourth, and fifth embodiments, as described in greater detail below.

The collar 632 differs from the previously described collars of the other embodiments. The collar 632 includes a first concave ear 642 and a second concave ear 644 connected to each other by screws and nuts, and surrounding the accessory housing 602. The collar 632 further includes a frictional retaining member in the form of an elastomeric O-ring 646 disposed between the inner circumferential walls of the ears 642, 644 and the outer circumferential wall of the accessory housing 602. The O-ring 646, which may be covered in grease or oil, is sized and configured to frictionally retain the accessory housing 602 in a desired rotational position relative to the collar 632. The O-ring 646 also allows rotation of the accessory housing 602 relative to the collar 632 upon application of sufficient torque to an outer wall of the accessory housing 602 by a user's hand to overcome the frictional force between the O-ring 646 and the accessory housing 602. Thus, the O-ring 646 reduces or eliminates the need for a threaded bolt and a knob in the collar to engage the outer wall of the accessory housing, like in the first embodiment discussed above. It should be understood that this O-ring design without a threaded bolt and knob could be implemented in any of the aforementioned embodiments of collars.

In other embodiments, the accessory housing 602 may additionally or alternatively include a plurality of recesses and the collar 632 spring biased pin, ball, or detent that engages recesses in the accessory housing 602 to provide a indexed rotational adjustment of the angular position of the accessory housing 602 relative to the collar 632. Other devices enabling indexed rotational adjustment of the accessory housing 602 relative to the collar 632 can be found, for example, in FIGS. 9A-16 and 35 of U.S. patent application Ser. No. 14/186,088, filed Feb. 21, 2014, which is incorporated by reference in its entirety.

Figure 25A:
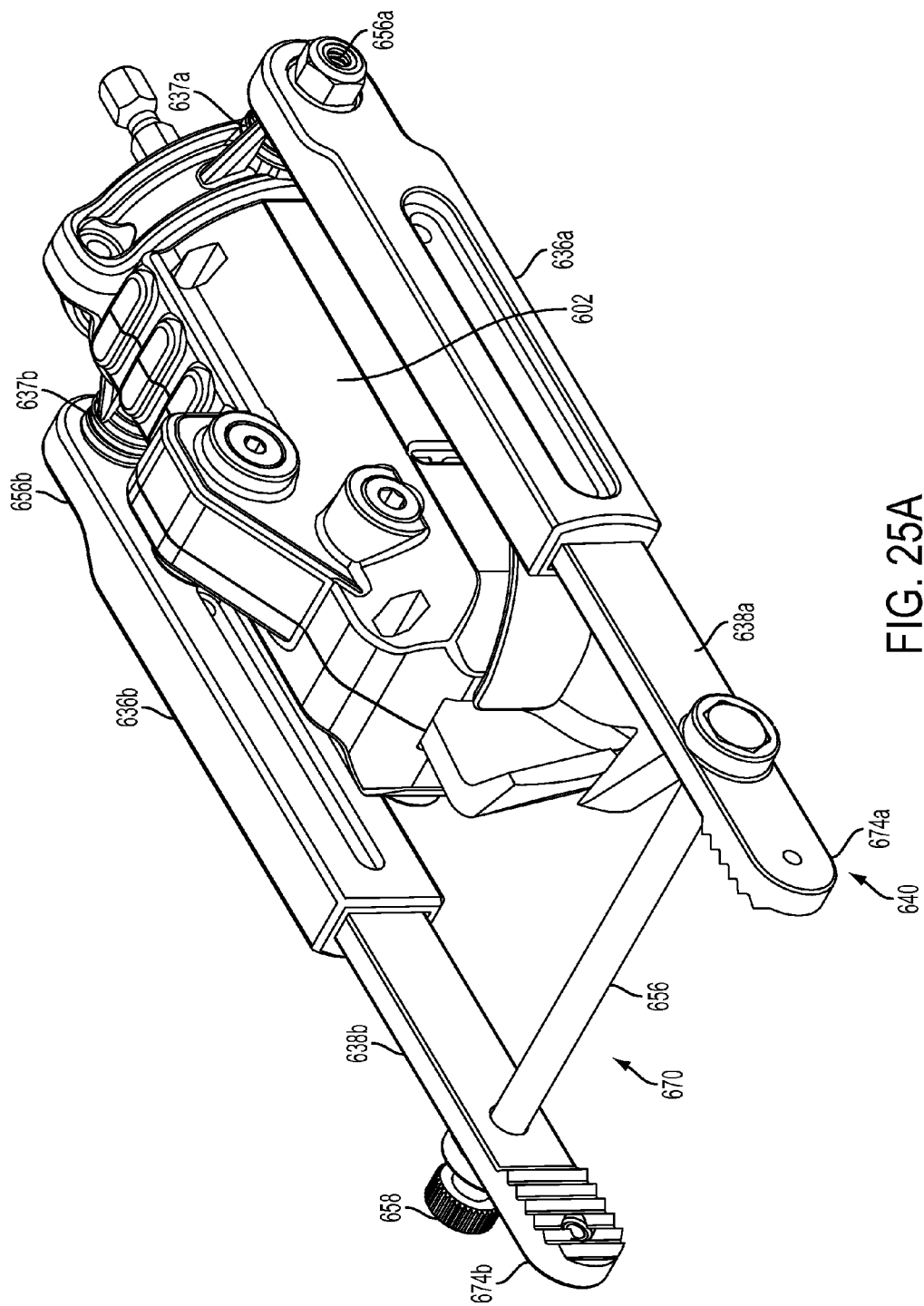

The arm assembly 634 includes a pair of arms 635a, 635b, each having a first arm portion 636a, 636b and a second arm portion 638a, 638b. The second arm portions 638a, 638b are coupled to the clamping assembly 640, as described in greater detail below. The first arm portions 636a, 636b are pivotably attached to the first and second ears 642, 644 of the collar 632 by pivot projections 656a, 656b that extend radially outward from the first and second ears 642, 644. Compression springs 637a, 637b are disposed between each of the first arm portions 636a, 636b and the corresponding ear 642, 644. The pivotal connections between the first arm portions 636a, 636b and the collar 632 enables the arms 635a, 635b to be pivoted relative to the accessory housing 602 to clamp different portions of the power tool, and allows the arm assembly 634 to be folded along the length of the accessory housing 602 for storage (as shown in FIG. 25A).

Similar to the arm assembly 134 of the first embodiment, each second arm portion 638a, 638b is telescopically received in a longitudinal opening in the corresponding first arm portion 636a. Each second arm portion 638a, 638b is coupled to a positioning pin 662a, 662b that is received in a longitudinal slot 666a, 666b in the corresponding first arm portion 636a, 636b. The telescopic connections between the first arm portions 636a, 636b and the second arm portions 638a, 638b allow the length of the arm assembly 634 to be adjustable by a user. In other embodiments, one or both of the longitudinal slots may be configured with bulging recesses and one or both of the positioning pins may be spring biased to allow for indexed movement of the second arm portions 638a, 638b relative to the first arm portions 636a, 636b. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

The clamping assembly 640 includes a bracket 670 formed by legs 674a, 674b at the ends of second arm portions 638a, 638b, a threaded rod 656 connecting the legs 674a, 674b, and locking nut 658 received on one end of the threaded rod 656. Each leg 674a, 674b may additionally include one or more of a plurality of ridges or protrusions and one or more sharp metal spikes, similar to the ridges or protrusions 176 and the sharp metal spikes 182 of the first embodiment, to enhance gripping of the power tool housing 12 by the legs 674a, 674b. The locking nut 658 is moveable between an unlocked position (FIG. 26A) where the legs 674a, 674b are apart from another and disengaged from the tool housing 12, and a locked position (FIGS. 23 and 26B) where the legs 674a, 674b are drawn toward one another to tightly engage the tool housing 12.

The arm assembly 634 and clamping assembly 640 are configured so that the legs 674a, 674b firmly grip and tightly engage the base 18 of the handle 14 adjacent to the battery receptacle 20. When attached to the tool housing 12, the arm assembly 634 and the clamping assembly 640 fix the accessory housing 602 to the tool housing 12 with a longitudinal axis L of the arm assembly 634 at an angle θ to the output axis X of the power tool 10, where the angle θ may be approximately 40 degrees to approximately 75 degrees. This configuration allows the cutting tool 606 to cut into a workpiece without the arm assembly 634 interfering with the cutting direction.

In use, first, the first arm portions 636a, 636b are unfolded from their storage position (FIG. 25A) to their operation position (FIG. 25B). Second, the locking nut 658 is loosened, which loosens the bracket 670 and allows the legs 674a, 674b to move apart from another to their unlocked position (FIG. 26A). Third, first arm portions 636a, 636b are pivoted relative to the collar 632 while the second arm portions 638a, 638b are longitudinally adjusted relative to the first arm portions 636a, 636b so that the legs 674a, 676b are received on either side of the base 18 of the handle 14, near the battery receptacle 20. Finally, the locking nut 658 is tightened to tightly clamp the legs 674a, 674b of the bracket 670 on the power tool housing 12 in their locked position (FIGS. 23 and 26B) This securely attaches the accessory housing 602 to the power tool housing 12. During operation, the accessory housing 602 may be rotated relative to the collar 632 by rotating the accessory housing 602 to overcome the frictional force of the O-ring 646, as described above.

Numerous modifications may be made to the exemplary implementations described above. These and other implementations are within the scope of the following claims.

What is claimed is:

1. A power tool accessory for use with a power tool having a tool housing and end effector coupled to the tool housing, the power tool accessory comprising:

an accessory housing;

an input shaft coupled to the accessory housing and configured to be coupled to and driven by the end effector;
a working tool coupled to the accessory housing and configured to be driven by the input shaft;
a brace including a collar coupled to the accessory housing, a clamp assembly configured to be rigidly connected to the power tool housing, and an arm assembly connecting the collar to the clamp assembly, wherein the collar is configured to allow selective rotation of the accessory housing relative to the collar while the brace rigidly couples the accessory housing to the power tool housing.

2. The power tool accessory of claim 1, wherein the collar includes a locking element having a locked configuration in which the accessory housing is rigidly fixed to the collar and an unlocked configuration in which the accessory housing is rotatable relative to the collar.

3. The power tool accessory of claim 2, wherein the locking element comprises a rotatable knob with a threaded stem that is configured to releasably engage the accessory housing.

4. The power tool accessory of claim 1, wherein the collar includes a frictional engaging member configured to retain the accessory housing in a desired rotational position relative to the collar and to allow the accessory housing to be rotated relative to the collar upon application of a sufficient rotational torque to the accessory housing.

5. The power tool accessory of claim 4, wherein the frictional engaging member comprises an elastomeric ring disposed between the collar and the accessory housing.

6. The power tool accessory of claim 1, wherein the arm assembly comprises a first arm portion pivotally coupled to the collar and a second arm portion coupled to the clamp assembly, wherein one of the first arm portion and the second arm portion is adjustable relative to the other of the first arm portion and the second arm portion to adjust a length of the arm assembly.

7. The power tool accessory of claim 1, wherein the clamp assembly includes a bracket configured to be removably coupled to a base of a handle of the power tool.

8. The power tool accessory of claim 1, wherein the clamp assembly includes a first leg configured to face a first side of the base, a second leg configured to face a second side of the base, and a threaded member configured to draw the legs toward one another.

9. The power tool accessory of claim 1, wherein the clamp assembly comprises one of a U-shaped brace, a cup-shaped bracket, and a hook shaped bracket, which are configured to be removably coupled to the power tool housing.

10. The power tool accessory of claim 1, wherein the working tool comprises shearing blades, wherein at least one of the blades moves in a scissor manner to cut a workpiece.

11. The power tool accessory of claim 1, wherein the arm assembly is configured to rotate relative to the collar to a storage position wherein the arm assembly extends along the accessory housing.

12. The power tool accessory of claim 1, further comprising:

first and second cutting shears at least partially extending from the accessory housing;
a transmission connected to the input shaft and to at least one of the first and second cutting shears, the transmission configured to convert rotational motion of the input shaft to shearing motion of the at least one of the first and second cutting shears; and
a plate coupled to an exterior wall of the accessory housing adjacent to the first and second cutting shears, the plate being harder than the accessory housing.

13. The power tool accessory of claim 12, wherein the accessory housing has a first sidewall and the cutting shears are curved toward the first sidewall and the plate wraps at least partially around the first sidewall.

14. The power tool accessory of claim 13, wherein the plate comprises a metal material and the accessory housing comprises a plastic material.

15. The power tool accessory of claim 1, wherein the arm assembly comprises a single arm first that has a first arm portion pivotally coupled to the collar and a second arm portion coupled to the clamp assembly, and
wherein the clamp assembly is configured to be coupled to a base of a handle of the power tool that is away from the tool housing, with the single arm at an angle to a working axis of the input shaft so that the brace rigidly couples the accessory housing to the power tool housing.

16. The power tool accessory of claim 15, wherein one of the first arm portion and the second arm portion is adjustable relative to the other of the first arm portion and the second arm portion to adjust a length of the single arm.

17. The power tool accessory of claim 16, wherein the one of the first arm portion and the second arm portion telescopes relative to the other of the first arm portion and the second arm portion.

18. The power tool accessory of claim 16, wherein the first arm portion is pivotally coupled to the accessory housing by a collar that is pivotally coupled to the first arm portion and that is coupled to a rear end portion of the accessory housing.

19. The power tool accessory of claim 16, wherein the working tool comprises shearing blades, wherein at least one of the blades moves in a scissor manner cut a workpiece.

20. The power tool accessory of claim 15, wherein the clamp assembly includes a bracket configured to be removably coupled to the base.

21. The power tool accessory of claim 20, wherein the clamp assembly includes a threaded fastener configured to be received in a threaded opening in the base of the tool housing.

22. The power tool accessory of claim 15, wherein the clamp assembly includes a first leg configured to face a first side of the base, a second leg configured to face a second side of the base, and a threaded member configured to draw the legs toward one another.

23. The power tool accessory of claim 22, wherein at least one of the first leg and the second leg includes at least one of ridges, protrusions, and a spike.

* * * * *